(12) United States Patent
Walton et al.

(10) Patent No.: US 7,002,900 B2
(45) Date of Patent: Feb. 21, 2006

(54) TRANSMIT DIVERSITY PROCESSING FOR A MULTI-ANTENNA COMMUNICATION SYSTEM

(75) Inventors: J. Rodney Walton, Carlisle, MA (US); John W. Ketchum, Harvard, MA (US); Mark S. Wallace, Bedford, MA (US); Steven J. Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/674,038

(22) Filed: Sep. 29, 2003

(65) Prior Publication Data

US 2004/0081073 A1    Apr. 29, 2004

Related U.S. Application Data

(60) Provisional application No. 60/421,309, filed on Oct. 25, 2002.

(51) Int. Cl.
*H04J 11/00* (2006.01)
(52) U.S. Cl. ..................................... 370/208
(58) Field of Classification Search ................ 370/203, 370/204, 208, 343, 319, 342
See application file for complete search history.

(56) References Cited

U.S. PATENT DOCUMENTS

| | | | |
|---|---|---|---|
| 2003/0060173 A1 * | 3/2003 | Lee et al. ..................... | 455/103 |
| 2003/0112745 A1 * | 6/2003 | Zhuang et al. ............... | 370/208 |
| 2003/0123381 A1 * | 7/2003 | Zhuang et al. ............... | 370/208 |
| 2003/0128658 A1 * | 7/2003 | Walton et al. ............... | 370/208 |
| 2003/0235147 A1 * | 12/2003 | Walton et al. .............. | 370/204 |

FOREIGN PATENT DOCUMENTS

| | | |
|---|---|---|
| EP | 1 185 001 | 3/2002 |
| EP | 1 241 824 | 9/2002 |

OTHER PUBLICATIONS

Li Lihua et al., "A Practical Space-Frequency Block Coded OFDM Scheme for Fast Fading Broadband Channels," 13th IEEE International Symposium On Personal Indoor and Mobile Radio Communications, vol. 1, Sep. 15, 2002, pp. 212-216.

* cited by examiner

*Primary Examiner*—Ricky Ngo
*Assistant Examiner*—Duc Duong
(74) *Attorney, Agent, or Firm*—Dmitry Milikovsky; Sandip S. (Micky) Minhas; Philip Wadsworth

(57) ABSTRACT

For transmit diversity in a multi-antenna OFDM system, a transmitter encodes, interleaves, and symbol maps traffic data to obtain data symbols. The transmitter processes each pair of data symbols to obtain two pairs of transmit symbols for transmission from a pair of antennas either (1) in two OFDM symbol periods for space-time transmit diversity or (2) on two subbands for space-frequency transmit diversity. $N_T \cdot (N_T-1)/2$ different antenna pairs are used for data transmission, with different antenna pairs being used for adjacent subbands, where $N_T$ is the number of antennas. The system may support multiple OFDM symbol sizes. The same coding, interleaving, and modulation schemes are used for different OFDM symbol sizes to simplify the transmitter and receiver processing. The transmitter performs OFDM modulation on the transmit symbol stream for each antenna in accordance with the selected OFDM symbol size. The receiver performs the complementary processing.

52 Claims, 10 Drawing Sheets

TRANSMIT DIVERSITY PROCESSING FOR A MULTI-ANTENNA COMMUNICATION SYSTEM

CLAIM OF PRIORITY UNDER 35 U.S.C. §119

The present Application for patent claims priority to Provisional Application Ser. No. 60/421,309 entitled "MIMO WLAN System," filed Oct. 25, 2002, assigned to the assignee hereof and hereby expressly incorporated by reference herein.

BACKGROUND

I. Field

The present invention relates generally to communication, and more specifically to techniques for processing data for transmit diversity in a multi-antenna communication system.

II. Background

A multi-antenna communication system employs multiple ($N_T$) transmit antennas and one or more ($N_R$) receive antennas for data transmission. The $N_T$ transmit antennas may be used to increase system throughput by transmitting independent data streams from these antennas. The $N_T$ transmit antennas may also be used to improve reliability by transmitting a single data stream redundantly from these antennas.

A multi-antenna system may also utilize orthogonal frequency division multiplexing (OFDM). OFDM is a modulation technique that effectively partitions the overall system bandwidth into multiple ($N_F$) orthogonal subbands. Each subband is associated with a respective subcarrier that may be modulated with data. The subbands are also commonly referred to as tones, subcarriers, bins, and frequency channels.

For a multi-antenna system, a propagation path exists between each pair of transmit and receive antennas. $N_T \cdot N_R$ propagation paths are formed between the $N_T$ transmit antennas and the $N_R$ receive antennas. These propagation paths may experience different channel conditions (e.g., different fading, multipath, and interference effects) and may achieve different signal-to-noise-and-interference ratios (SNRs). The channel responses of the $N_T \cdot N_R$ propagation paths may thus vary from path to path. For a dispersive communication channel, the channel response for each propagation path also varies across the $N_F$ subbands. Since the channel conditions may vary over time, the channel responses for the propagation paths may vary likewise.

Transmit diversity refers to the transmission of data redundantly across space, frequency, time, or a combination of these three dimensions, to improve the reliability of the data transmission. One goal of transmit diversity is to maximize diversity for the data transmission across as many dimensions as possible to achieve robust performance. Another goal is to simplify the processing for transmit diversity at both a transmitter and a receiver. There is therefore a need in the art for techniques to efficiently process data for transmit diversity in a multi-antenna system.

SUMMARY

Techniques for performing transmit diversity processing in a multi-antenna OFDM system are provided herein. A transmitter encodes traffic data in accordance with a coding scheme to obtain coded data. The coding scheme may comprise a fixed rate base code and a set of repetition and/or puncturing patterns for a set of code rates supported by the system. The transmitter interleaves the coded data in accordance with an interleaving scheme to obtain interleaved data. The transmitter next symbol maps the interleaved data in accordance with a modulation scheme to obtain a stream of data symbols. The system may support multiple OFDM symbol sizes for improved efficiency. The same or similar coding, interleaving, and modulation schemes may be used for different OFDM symbol sizes to simplify the processing at the transmitter and receiver.

The transmitter processes each pair of data symbols to obtain two pairs of transmit symbols for transmission from a pair of transmit antennas. Each transmit symbol is a version of a data symbol. The two pairs of transmit symbols may be transmitted from the pair of antennas either (1) on the same subband in two OFDM symbol periods for space-time transmit diversity (STTD) or (2) on two subbands in the same OFDM symbol period for space-frequency transmit diversity (SFTD). If $N_T$ transmit antennas are available for data transmission, then $N_T \cdot (N_T-1)/2$ different pairs of antennas may be used to transmit the stream of data symbols. The transmitter transforms (e.g., performs OFDM modulation on) the stream of transmit symbols for each transmit antenna in accordance with a selected OFDM symbol size to obtain a corresponding stream of OFDM symbols for the transmit antenna.

The receiver performs the complementary processing to recover the traffic data, as described below. Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The transmit diversity processing techniques described herein may be used for (1) a multiple-input single-output (MISO) system with multiple transmit antennas and a single receive antenna and (2) a multiple-input multiple-output (MIMO) system with multiple transmit antennas and multiple receive antennas. These techniques may also be used for the downlink as well as the uplink. The downlink (i.e., forward link) is the communication link from an access point (e.g., a base station) to a user terminal (e.g., a mobile station), and the uplink (i.e., reverse link) is the communication link from the user terminal to the access point. For clarity, these techniques are described for the downlink in an exemplary multi-antenna system that utilizes OFDM. For this exemplary system, the access point is equipped with four antennas and each user terminal is equipped with one or more antennas.

Figure 1:
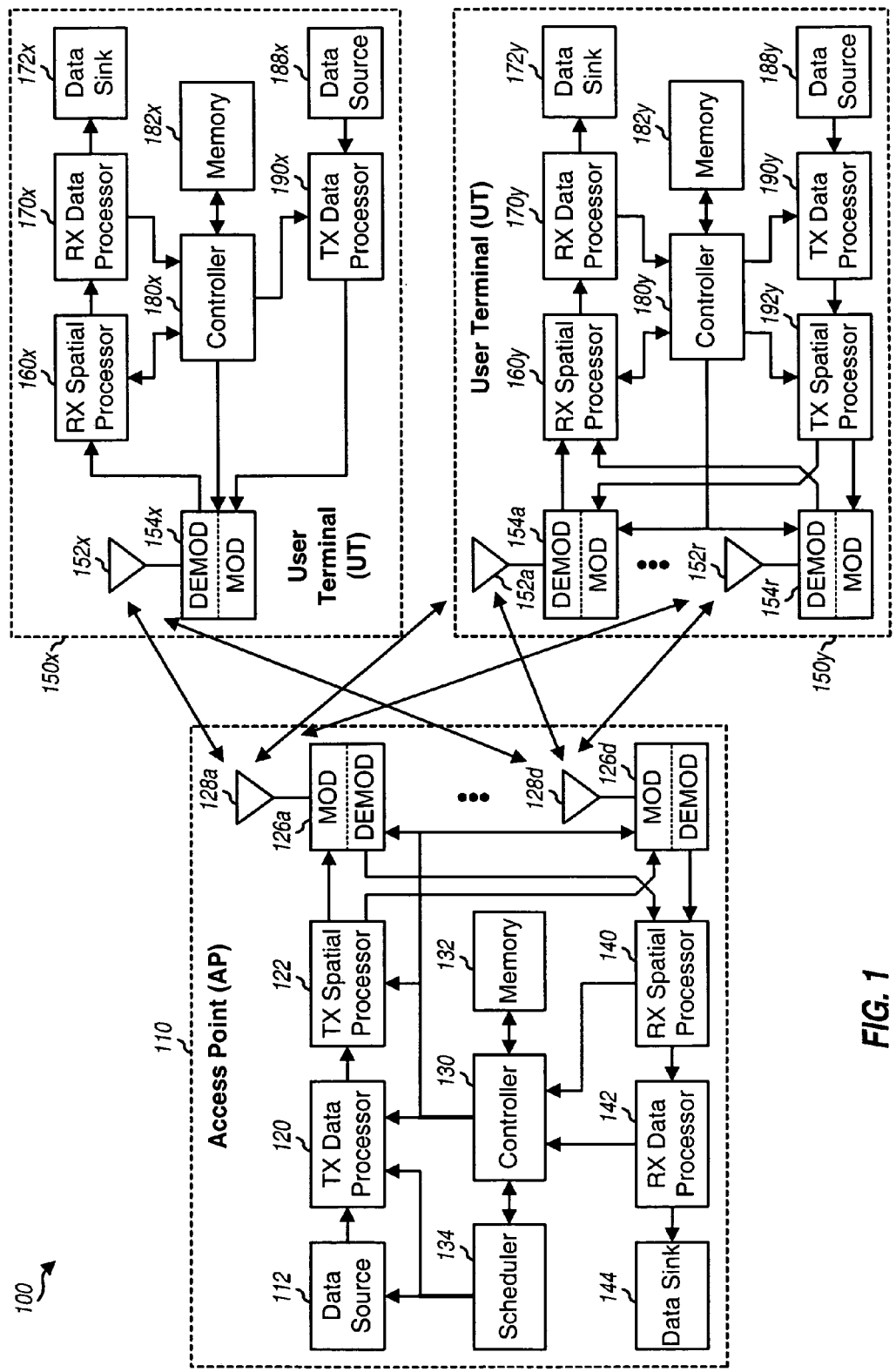
FIG. 1 shows an access point and two user terminals in a multi-antenna OFDM system.

FIG. 1 shows a block diagram of an embodiment of an access point 110 and two user terminals 150x and 150y in a multi-antenna OFDM system 100. User terminal 150x is equipped with a single antenna 152x, and user terminal 150y is equipped with multiple antennas 152a through 152r.

On the downlink, at access point 110, a transmit (TX) data processor 120 receives traffic data (e.g., information bits) from a data source 112, control data from a controller 130, and possibly other data from a scheduler 134. The various types of data may be sent on different transport channels. TX data processor 120 processes (e.g., frames, scrambles, encodes, interleaves, and symbol maps) the different types of data based on one or more coding and modulation schemes to obtain a stream of modulation symbols. As used herein, a "data symbol" refers to a modulation symbol for data, and a "pilot symbol" refers to a modulation symbol for pilot. A TX spatial processor 122 receives the data symbol stream from TX data processor 120, performs spatial processing on the data symbols for transmit diversity, multiplexes in pilot symbols, and provides one stream of transmit symbols for each transmit antenna. The processing by TX data processor 120 and TX spatial processor 122 is described below.

Each modulator (MOD) 126 receives and processes a respective transmit symbol stream to obtain a stream of OFDM symbols and further conditions (e.g., amplifies, filters, and frequency upconverts) the OFDM symbol stream to generate a downlink signal. Four downlink signals from four modulators 126a through 126d are transmitted from four antennas 128a through 128d, respectively, to the user terminals.

At each user terminal 150, one or multiple antennas 152 receive the transmitted downlink signals, and each antenna provides a received signal to a respective demodulator (DEMOD) 154. Each demodulator 154 performs processing complementary to that performed at modulator 126 and provides a stream of received symbols. A receive (RX) spatial processor 160 performs spatial processing on the received symbol streams from all demodulators 154 to obtain a stream of recovered data symbols, which is an estimate of the stream of data symbols transmitted by access point 110. An RX data processor 170 receives and demultiplexes the recovered data symbols into their respective transport channels. The recovered data symbols for each transport channel are then processed (e.g., demapped, deinterleaved, decoded, and descrambled) to obtain decoded data for that transport channel. The decoded data for each transport channel may include recovered user data, control data, and so on, which may be provided to a data sink 172 for storage and/or a controller 180 for further processing.

At each user terminal 150, a channel estimator (not shown in FIG. 1) estimates the downlink channel response and provides channel estimates, which may include channel gain (or path gain) estimates, SNR estimates, and so on. RX data processor 170 may also provide the status of each packet/frame received on the downlink. Controller 180 receives the channel estimates and the packet/frame status and assembles feedback information for access point 110. The feedback information and uplink data are processed by a TX data processor 190, spatially processed by a TX spatial processor 192 (if present at user terminal 150), multiplexed with pilot symbols, conditioned by one or more modulators 154, and transmitted via one or more antennas 152 to access point 110.

At access point 110, the transmitted uplink signal(s) are received by antennas 128, demodulated by demodulators 126, and processed by an RX spatial processor 140 and an RX data processor 142 in a complementary manner to that performed at user terminal 150. The recovered feedback information is provided to controller 130 and scheduler 134. Scheduler 134 may use the feedback information to perform a number of functions such as (1) scheduling a set of user terminals for data transmission on the downlink and uplink and (2) assigning the available downlink and uplink resources to the scheduled terminals.

Controllers 130 and 180 control the operation of various processing units at access point 110 and user terminal 150, respectively. For example, controller 180 may determine the maximum rate supported by the downlink for user terminal 150. Controller 130 may select the rate, payload size, and OFDM symbol size for each scheduled user terminal.

The processing at access point 110 and user terminal 150 for the uplink may be the same or different from the processing for the downlink.

System 100 utilizes a set of transport channels to transmit different types of data. In an exemplary design, on the downlink, access point 110 transmits system information on a broadcast channel (BCH), control data on a forward control channel (FCCH), and traffic data to specific user terminals on a forward channel (FCH). On the uplink, user terminal 150 transmits access data and messages on a random access channel (RACH) and traffic data on a reverse channel (RCH). Other system designs may use different and/or other transport channels. Transmit diversity may be used for each of the transport channels.

Figure 2:
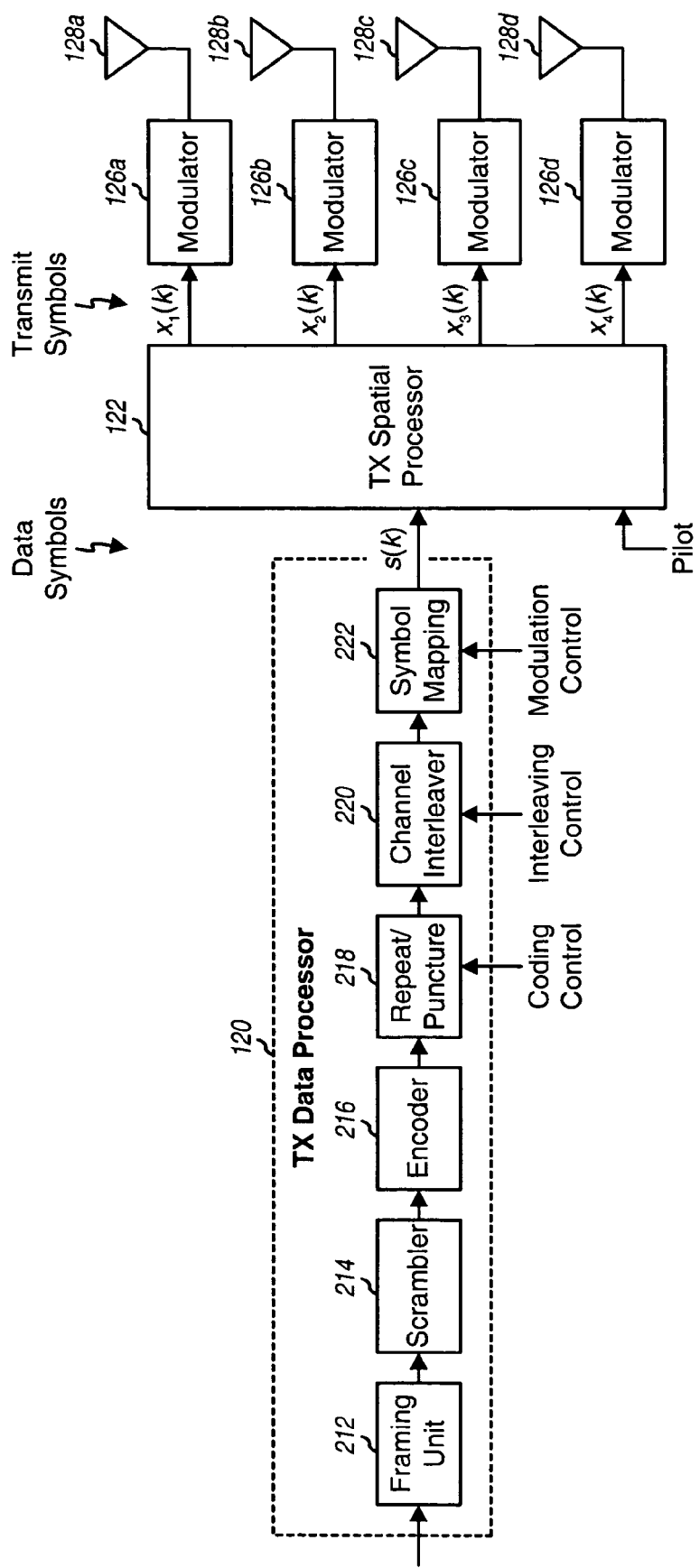
FIG. 2 shows the transmitter portion of the access point.

FIG. 2 shows a block diagram of the transmitter portion of access point 110. Within TX data processor 120, a framing unit 212 formats each data packet, for example, by generating a cyclic redundancy check (CRC) value and appending a header for the packet. The CRC value may be used by a receiver to determine whether the packet is decoded correctly or in error. The framing may be performed for some transport channels and omitted for other transport channels. The framing may also be different for different transport channels. Each packet is coded and modulated separately and designated for transmission over a particular time duration (e.g., one or more OFDM symbol periods). A scrambler 214 scrambles the framed/unframed data to randomize the data.

An encoder 216 encodes the scrambled data in accordance with a coding scheme and provides code bits. The encoding increases the reliability of the data transmission. A repeat/puncture unit 218 then repeats or punctures (i.e., deletes) some of the code bits to obtain the desired code rate for each packet. In an embodiment, encoder 216 is a rate ½ binary convolutional encoder. A code rate of ¼ may be obtained by repeating each code bit once. Code rates greater than ½ may be obtained by deleting some of the code bits from encoder 216. An interleaver 220 interleaves (i.e., reorders) the code bits from repeat/puncture unit 218 based on an interleaving scheme. The interleaving provides time, frequency, and/or spatial diversity for the code bits.

A symbol mapping unit 222 maps the interleaved data in accordance with a selected modulation scheme and provides data symbols. The symbol mapping may be achieved by (1) grouping sets of B bits to form B-bit binary values, where $B \geq 1$, and (2) mapping each B-bit binary value to a point in a signal constellation corresponding to the selected modulation scheme. Each mapped signal point is a complex value and corresponds to a data symbol. Symbol mapping unit 222 provides a stream of data symbols to TX spatial processor 122.

Exemplary designs for encoder 216, repeat/puncture unit 218, interleaver 220, and symbol mapping unit 222 are described below. The encoding, interleaving, and symbol mapping may be performed based on control signals provided by controller 130.

TX spatial processor 122 receives the stream of data symbols from TX data processor 120 and performs spatial processing for transmit diversity, as described below. TX spatial processor 122 provides one stream of transmit symbols to each of four modulators 126a through 126d for the four transmit antennas.

Figure 3:
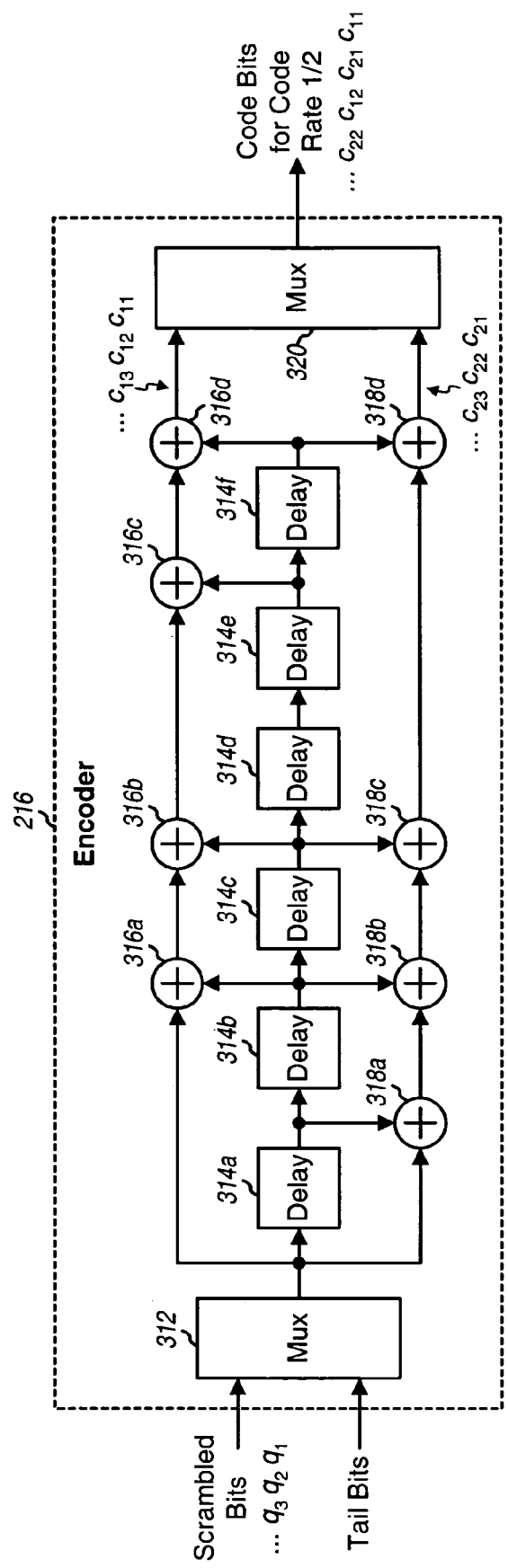
FIG. 3 shows an encoder.

FIG. 3 shows an embodiment of encoder 216, which implements a base code for the system. In this embodiment, the base code is a rate ½, constraint length 7 (K=7) convolutional code with generators of 133 and 171 (octal).

Within encoder 216, a multiplexer 312 receives the scrambled bits for each packet from scrambler 214 and tail bits (e.g., zeros) and provides the scrambled bits first followed by six tail bits. Encoder 216 also includes six delay elements 314a through 314f coupled in series. Four adders 316a through 316d are also coupled in series and used to implement the first generator (133). Similarly, four adders 318a through 318d are coupled in series and used to implement the second generator (171). The adders are further coupled to delay elements 314 in a manner to implement the two generators of 133 and 171, as shown in FIG. 3.

The scrambled bits are provided to the first delay element 314a and to adders 316a and 318a. For each clock cycle, adders 316a through 316d perform modulo-2 addition of the incoming bit and four prior bits stored in delay elements 314b, 314c, 314e, and 314f to obtain the first code bit for that clock cycle. Similarly, adders 318a through 318d perform modulo-2 addition of the incoming bit and four prior bits stored in delay elements 314a, 314b, 314c, and 314f to obtain the second code bit for that clock cycle. A multiplexer 320 receives and multiplexes the two streams of code bits from the two generators into a single stream of code bits. For each scrambled bit $q_n$, where n is a bit index, two code bits $c_{1n}$ and $c_{2n}$ are generated, which results in a code rate of ½.

System 100 supports a set of "rates" for data transmission. Table 1 lists an exemplary set of 14 rates supported by the system, which are identified by rate indices 0 through 13. The rate having index 0 is for a null data rate (i.e., no data transmission). Each of the non-zero rate is associated with a particular spectral efficiency, a particular code rate, a particular modulation scheme, and a particular minimum SNR required to achieve the desired level of performance (e.g., 1% packet error rate (PER)) for a non-fading AWGN channel. Spectral efficiency refers to the data rate (i.e., the information bit rate) normalized by the system bandwidth, and is given in units of bits per second per Hertz (bps/Hz). The spectral efficiency for each rate is determined by the coding scheme and the modulation scheme for that rate. The code rate and modulation scheme for each rate in Table 1 are specific to the exemplary system.

TABLE 1

| Rate Index | Spectral Efficiency (bps/Hz) | Code Rate | Modulation Scheme | Required SNR (dB) | Short OFDM Symbol | | Long OFDM Symbol | |
|---|---|---|---|---|---|---|---|---|
| | | | | | Info Bits/ OFDM Symbol | Code Bits/ OFDM Symbol | Info Bits/ OFDM Symbol | Code Bits/ OFDM Symbol |
| 0 | 0.00 | — | — | — | 0 | 0 | 0 | 0 |
| 1 | 0.25 | 1/4 | BPSK | −1.8 | 12 | 48 | 48 | 192 |
| 2 | 0.5 | 1/2 | BPSK | 1.2 | 24 | 48 | 96 | 192 |
| 3 | 1.0 | 1/2 | QPSK | 4.2 | 48 | 96 | 192 | 384 |
| 4 | 1.5 | 3/4 | QPSK | 6.8 | 72 | 96 | 288 | 384 |
| 5 | 2.0 | 1/2 | 16 QAM | 10.1 | 96 | 192 | 384 | 768 |
| 6 | 2.5 | 5/8 | 16 QAM | 11.7 | 120 | 192 | 480 | 768 |
| 7 | 3.0 | 3/4 | 16 QAM | 13.2 | 144 | 192 | 576 | 768 |
| 8 | 3.5 | 7/12 | 64 QAM | 16.2 | 168 | 288 | 672 | 1152 |
| 9 | 4.0 | 2/3 | 64 QAM | 17.4 | 192 | 288 | 768 | 1152 |
| 10 | 4.5 | 3/4 | 64 QAM | 18.8 | 216 | 288 | 864 | 1152 |
| 11 | 5.0 | 5/6 | 64 QAM | 20.0 | 240 | 288 | 960 | 1152 |
| 12 | 6.0 | 3/4 | 256 QAM | 24.2 | 288 | 384 | 1152 | 1536 |
| 13 | 7.0 | 7/8 | 256 QAM | 26.3 | 336 | 384 | 1344 | 1536 |

In Table 1, BPSK denotes binary phase shift keying, QPSK denotes quadrature phase shift keying, and QAM denotes quadrature amplitude modulation.

Encoder 216 encodes each packet and generates rate ½ code bits based on a single base code. All other code rates supported by the system (as listed in Table 1) may be obtained by either repeating or puncturing the code bits.

Figure 4:
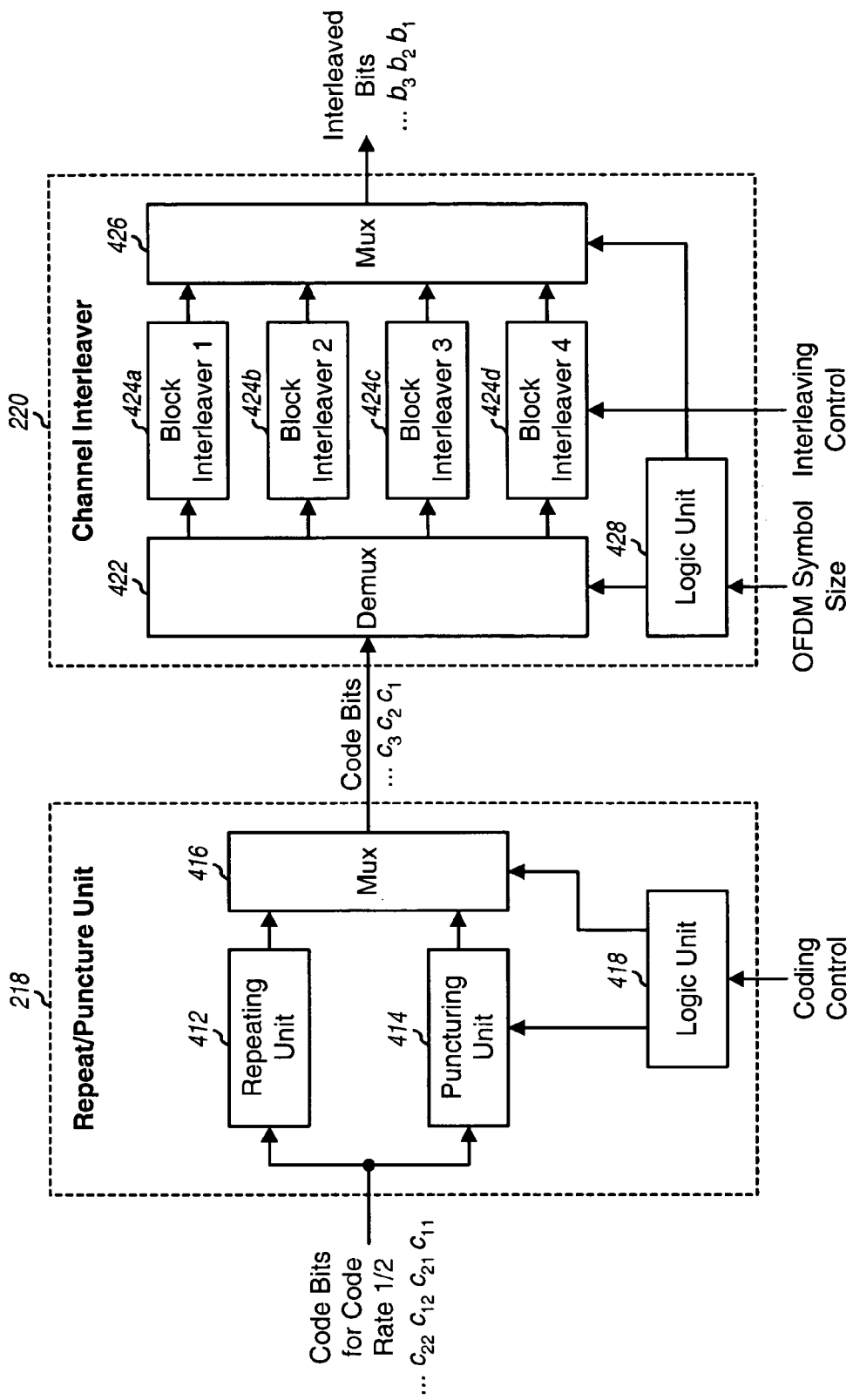
FIG. 4 shows a repeat/puncture unit and a channel interleaver.

FIG. 4 shows an embodiment of repeat/puncture unit 218, which can be used to generate various code rates based on the base code rate of ½. Within repeat/puncture unit 218, the rate ½ code bits from encoder 216 are provided to either a repeating unit 412 or a puncturing unit 414. Repeating unit 412 repeats each rate ½ code bit once to obtain an effective code rate of ¼. Puncturing unit 414 deletes some of the rate ½ code bits based on a specific puncturing pattern to obtain the desired code rate. Table 2 lists exemplary puncturing patterns that may be used for the code rates supported by the system. Other puncturing patterns may also be used.

TABLE 2

| Code Rate | Puncturing Pattern |
|---|---|
| 1/2 | 11 |
| 7/12 | 11111110111110 |

TABLE 2-continued

| Code Rate | Puncturing Pattern |
| --- | --- |
| 5/8 | 1110111011 |
| 2/3 | 1110 |
| 3/4 | 111001 |
| 5/6 | 1110011001 |
| 7/8 | 11101010011001 |

For a k/n code rate, there are n coded bits for every k information bits. The rate ½ base code provides 2 k rate ½ code bits for every k information bits. To obtain code rate of k/n, puncturing unit 218 outputs n code bits for each input group of 2 k rate ½ code bits received from encoder 216. Thus, 2 k−n code bits are deleted from each group of 2 k rate ½ code bits to obtain the n rate k/n code bits. The code bits to be deleted from each group are denoted by zeros in the puncturing pattern. For example, to obtain a code rate of 7/12, two code bits are deleted from each group of 14 code bits from encoder 216, with the deleted bits being the 8-th and 14-th bits in the group, as denoted by the puncturing pattern "11111110111110." No puncturing is performed if the desired code rate is ½.

A multiplexer 416 receives the stream of code bits from repeating unit 412 and the stream of code bits from puncturing unit 414. Multiplexer 416 provides the code bits from repeating unit 412 if the desired code rate is ¼ and the code bits from puncturing unit 414 if the desired code rate is ½ or higher. A logic unit 418 receives the coding control and generates a puncturing control for puncturing unit 414 and a multiplexer control for multiplexer 416.

Other coding schemes and puncturing patterns besides those described above may also be used, and this is within the scope of the invention. For example, a Turbo code, a low density parity check (LDPC) code, a block code, some other codes, or any combination thereof may be used to encode data. Also, different coding schemes may be used for different transport channels. For example, a convolutional code may be used for transport channels carrying system information and control data, and a Turbo code may be used for transport channels carrying traffic data.

With the coding and puncturing schemes described above, multiple code rates can be supported with the same encoder at the access point and the same decoder at the user terminal. This can greatly simplify the designs of the access point and the user terminal.

System 100 utilizes two OFDM symbol sizes to achieve greater efficiency. In an exemplary design, a "short" OFDM symbol is composed of 64 subbands, and a "long" OFDM symbol is composed of 256 subbands. For the short OFDM symbol, the 64 subbands are assigned indices of −32 to +31, 48 subbands (e.g., with indices of $K_S = \pm\{1, \ldots, 6, 8, \ldots, 20, 22, \ldots, 26\}$) are used for data transmission and are referred to as data subbands, 4 subbands (e.g., with indices of $\pm\{7, 21\}$) are used for pilot transmission, the DC subband (with index of 0) is not used, and the remaining subbands are also not used and serve as guard subbands. For the long OFDM symbol, the 256 subbands are assigned indices of −128 to +127, 192 subbands (e.g., with indices of $K_L = \pm\{1, \ldots, 24, 29, \ldots, 80, 85, \ldots, 104\}$) are used for data transmission, 16 subbands (e.g., with indices of $\pm\{25, \ldots, 28, 81, \ldots, 84\}$) are used for pilot transmission, the DC subband is not used, and the remaining subbands are also not used and serve as guard subbands.

The pilot and data subbands for the long OFDM symbol may be mapped to the pilot and data subbands for the short OFDM symbol based on the following:

$$k_l = 4 \cdot k_s - \text{sgn}(k_s) \cdot k_{os}, \qquad \text{Eq (1)}$$

where $k_s$ is an index for the subbands of the short OFDM symbol ($k_s \in K_S$);
$k_{os}$ is a subband index offset ($k_{os} \in \{0,1,2,3\}$);
$\text{sgn}(k_s)$ provides the sign of $k_s$ (i.e., "+" or "−"); and
$k_l$ is an index for the subbands of the long OFDM symbol ($k_l \in K_L$).

Each data/pilot subband of the short OFDM symbol is associated with four data/pilot subbands of the long OFDM symbol, which are associated with four values for the subband index offset $k_{os}$.

Table 1 also lists the number of data bits that may be sent in each short and long OFDM symbol for each non-zero rate. A data packet may be sent using any number of long OFDM symbols and a small number of short OFDM symbols. For example, a data packet may be sent using $N_L$ long OFDM symbols and $N_S$ short OFDM symbols, where $N_L \geq 0$ and $3 \geq N_S \geq 0$. The $N_S$ short OFDM symbols at the end of the $N_L$ long OFDM symbols reduce the amount of unused capacity. OFDM symbols of different sizes may thus be used to better match the data-carrying capacity of the OFDM symbols to the packet payload to maximize packing efficiency.

In an embodiment, the same interleaving scheme is used for both the short and long OFDM symbols. The code bits to be transmitted in each short OFDM symbol are interleaved across all 48 data subbands. The code bits to be transmitted in each long OFDM symbol are partitioned into four blocks, and the code bits in each block are interleaved across a respective group of 48 data subbands. For both cases, the interleaving is performed over one OFDM symbol period.

FIG. 4 also shows an embodiment of interleaver 220, which can be used for both the short and long OFDM symbols. Within interleaver 220, a demultiplexer 422 receives a sequence of code bits for each OFDM symbol from repeat/puncture unit 218. The code bit sequence is denoted as $\{c_i\}$, where $i \in \{0, \ldots, 48 \cdot B - 1\}$ for the short OFDM symbol, $i \in \{0, \ldots, 192 \cdot B - 1\}$ for the long OFDM symbol, and B is the number of code bits for each modulation symbol.

For a short OFDM symbol, multiplexer 422 provides all 48·B code bits in the sequence to a block interleaver 424a. Interleaver 424a then interleaves (i.e., reorders) the code bits across the 48 data subbands of the short OFDM symbol in accordance with the frequency interleaving scheme shown in Table 3. For this interleaving scheme, each code bit in the sequence $\{c_i\}$ is assigned a bit index of i modulo-48. The code bits in the sequence are effectively partitioned into B groups, with each group containing 48 code bits that are assigned bit indices of 0 through 47. Each bit index is associated with a respective data subband. All code bits with the same bit index are transmitted on the data subband associated with that bit index. For example, the first code bit (with bit index of 0) in each group is transmitted on subband −26, the second code bit (with bit index of 1) is transmitted on subband 1, the third code bit (with bit index of 2) is transmitted on subband −17, and so on. After the entire sequence of code bits has been interleaved, block interleaver 424a provides the interleaved bits to a multiplexer 426. For the short OFDM symbol, block interleavers 424b, 424c, and 424d are not used, and multiplexer 426 provides the interleaved bits from only block interleaver 424a.

TABLE 3

| Subband Index $k_s$ | Bit Index |
|---|---|
| — | — |
| −26 | 0 |
| −25 | 6 |
| −24 | 12 |
| −23 | 18 |
| −22 | 24 |
| −21 | — |
| −20 | 30 |
| −19 | 36 |
| −18 | 42 |
| −17 | 2 |
| −16 | 8 |
| −15 | 14 |
| −14 | 20 |
| −13 | 26 |
| −12 | 32 |
| −11 | 38 |
| −10 | 44 |
| −9 | 4 |
| −8 | 10 |
| −7 | — |
| −6 | 16 |
| −5 | 22 |
| −4 | 28 |
| −3 | 34 |
| −2 | 40 |
| −1 | 46 |
| 0 | — |
| 1 | 1 |
| 2 | 7 |
| 3 | 13 |
| 4 | 19 |
| 5 | 25 |
| 6 | 31 |
| 7 | — |
| 8 | 37 |
| 9 | 43 |
| 10 | 3 |
| 11 | 9 |
| 12 | 15 |
| 13 | 21 |
| 14 | 27 |
| 15 | 33 |
| 16 | 39 |
| 17 | 45 |
| 18 | 5 |
| 19 | 11 |
| 20 | 17 |
| 21 | — |
| 22 | 23 |
| 23 | 29 |
| 24 | 35 |
| 25 | 41 |
| 26 | 47 |
| — | — |
| — | — |

For a long OFDM symbol, demultiplexer 422 provides the first block of 48·B code bits in the sequence to block interleaver 424a, the next block of 48·B code bits to block interleaver 424b, the third block of 48·B code bits to block interleaver 424c, and the last block of 48·B code bits to block interleaver 424d. The four blocks of code bits in interleavers 424a through 424d are assigned subband index offsets of $k_{os}$=0, 1, 2, and 3, respectively. Each block interleaver 424 interleaves its code bits across 48 data subbands in the manner described above for the short OFDM symbol. After the entire sequence of code bits have been interleaved, multiplexer 426 receives the interleaved bits from block interleavers 424a through 424d and maps these bits in the proper order to the corresponding subbands of the long OFDM symbol. In particular, the short OFDM symbol subband index $k_s$ and the subband index offset $k_{os}$ for each block interleaver 424 are used to generate the corresponding long OFDM symbol subband index $k_l$, as shown in equation (1). A logic unit 428 receives the OFDM symbol size from controller 130 and generates the controls for demultiplexer 422 and multiplexer 426.

FIG. 4 shows an exemplary design for channel interleaver 220. Other designs that can support both the short and long OFDM symbols may also be used. For example, one interleaver may be used to store all of the code bits to be interleaved. Multiplexer 426 or demultiplexer 422 would then map the code bits from this interleaver to the proper subbands.

The frequency interleaving scheme shown in Table 3 assigns code bits with even indices (after the puncturing) to subbands with negative indices and code bits with odd indices to subbands with positive indices. For code rate ½, the code bits from the first generator 133 are transmitted on subbands with negative indices and the code bits from the second generator 171 are transmitted on subbands with positive indices. The code bits may also be shuffled such that the code bits from each generator are spread across all data subbands.

The interleaving may be performed in various other manners. For example, after the interleaving across the data subbands, the code bits for each subband may further be interleaved over multiple OFDM symbol periods to achieve time diversity.

For both the short and long OFDM symbols, interleaver 220 provides a sequence of interleaved code bits for each OFDM symbol. The sequence contains B interleaved code bits for each data subband. Symbol mapping unit 222 then maps the interleaved code bits to data symbols based on a modulation scheme determined by the selected rate, as shown in Table 1.

Table 4 shows the symbol mapping for six modulation schemes supported by the system. For each modulation scheme (except for BPSK), B/2 code bits are mapped to an inphase (I) component and the other B/2 code bits are mapped to a quadrature (Q) component. In an embodiment, the signal constellation for each modulation scheme is defined based on Gray mapping. With Gray mapping, neighboring points in the signal constellation (in both the I and Q components) differ by only one bit position. Gray mapping reduces the number of bit errors for the more likely error events, which correspond to a received symbol being mapped to a location near the correct location, in which case only one code bit would be detected in error.

TABLE 4

| BPSK | | |
|---|---|---|
| $b_0$ | I | Q |
| 0 | −1 | 0 |
| 1 | 1 | 0 |

| QPSK | | | |
|---|---|---|---|
| $b_0$ | I | $b_1$ | Q |
| 0 | −1 | 0 | −1 |
| 1 | 1 | 1 | 1 |

TABLE 4-continued

16 QAM

| $b_0b_1$ | I | $b_2b_3$ | Q |
|---|---|---|---|
| 00 | −3 | 00 | −3 |
| 01 | −1 | 01 | −1 |
| 11 | 1 | 11 | 1 |
| 10 | 3 | 10 | 3 |

64 QAM

| $b_0b_1b_2$ | I | $b_3b_4b_5$ | Q |
|---|---|---|---|
| 000 | −7 | 000 | −7 |
| 001 | −5 | 001 | −5 |
| 011 | −3 | 011 | −3 |
| 010 | −1 | 010 | −1 |
| 110 | 1 | 110 | 1 |
| 111 | 3 | 111 | 3 |
| 101 | 5 | 101 | 5 |
| 100 | 7 | 100 | 7 |

256 QAM

| $b_0b_1b_2b_3$ | I | $b_4b_5b_6b_7$ | Q |
|---|---|---|---|
| 0000 | −15 | 0000 | −15 |
| 0001 | −13 | 0001 | −13 |
| 0011 | −11 | 0011 | −11 |
| 0010 | −9 | 0010 | −9 |
| 0110 | −7 | 0110 | −7 |
| 0111 | −5 | 0111 | −5 |
| 0101 | −3 | 0101 | −3 |
| 0100 | −1 | 0100 | −1 |
| 1100 | 1 | 1100 | 1 |
| 1101 | 3 | 1101 | 3 |
| 1111 | 5 | 1111 | 5 |
| 1110 | 7 | 1110 | 7 |
| 1010 | 9 | 1010 | 9 |
| 1011 | 11 | 1011 | 11 |
| 1001 | 13 | 1001 | 13 |
| 1000 | 15 | 1000 | 15 |

Normalization Factor $K_{mod}$

| Modulation Scheme | Value |
|---|---|
| BPSK | 1.0 |
| QPSK | $1/\sqrt{2}$ |
| 16 QAM | $1/\sqrt{10}$ |
| 64 QAM | $1/\sqrt{42}$ |
| 256 QAM | $1/\sqrt{170}$ |

For each of the four QAM modulation schemes shown in Table 4, the left-most bit for each component is least likely to be received in error and the right-most bit for each component is most likely to be received in error. To achieve equal likelihood of error for each bit position, the B bits that make up each QAM symbol may be shuffled. This would in effect implement interleaving across the dimensions of the QAM symbols such that the code bits forming the QAM symbols are mapped to different bit positions of the QAM symbols.

The I and Q values for each modulation scheme shown in Table 4 are scaled by a normalization factor $K_{mod}$ so that the average power of all signal points in the associated signal constellation is equal to unity. The normalization factor for each modulation scheme is shown in Table 4. Quantized values for the normalization factors may also be used. The data symbol s(k) for each data subband would then have the following form:

$$s(k)=(I+jQ)\cdot K_{mod}, \quad \text{Eq (2)}$$

where $k \in K_S$ for the short OFDM symbol and $k \in K_L$ for the long OFDM symbol;

I and Q are the values in Table 4 for the selected modulation scheme; and $K_{mod}$ is dependent on the selected modulation scheme.

System 100 performs spatial processing to achieve transmit diversity across two dimensions. In an embodiment, system 100 implements (1) space-time transmit diversity (STTD) on a per-subband and per-OFDM-symbol-pair basis to achieve space and time diversity for the short OFDM symbol and (2) space-frequency transmit diversity (SFTD) on a per-subband-pair and per-OFDM-symbol basis to achieve space and frequency diversity for the long OFDM symbol.

An exemplary STTD scheme for the short OFDM symbol operates as follows. Suppose that two data symbols, denoted as $s_1$ and $s_2$, are to be transmitted on a given subband. The access point generates two vectors, $x_1=[s_1 s_2]^T$ and $x_2=[s^*_2 -s^*_1]^T$, where "*" denotes the complex conjugate and "$T$" denotes the transpose. Each vector includes two transmit symbols that are to be transmitted from two antennas in one OFDM symbol period (e.g., vector $x_1$ is transmitted from two antennas in the first OFDM symbol period, and vector $x_2$ is transmitted from two antennas in the next OFDM symbol period). Each data symbol is thus transmitted over two OFDM symbol periods (e.g., transmit symbol $s_1$ is transmitted from one antenna in the first symbol OFDM period, and transmit symbol $-s^*_1$ is transmitted from another antenna in the next OFDM symbol period).

If the user terminal is equipped with a single antenna, then the received symbols may be expressed as:

$$r_1=h_1 s_1+h_2 s_2+n_1, \text{ and} \quad \text{Eq (3)}$$

$$r_2=h_1 s^*_2-h_2 s^*_1+n_2,$$

where $r_1$ and $r_2$ are two received symbols for two consecutive OFDM symbol periods;

$h_1$ and $h_2$ are the path gains from the two transmit antennas to the receive antenna for the subband under consideration; and $n_1$ and $n_2$ are the noise for the two received symbols $r_1$ and $r_2$, respectively.

The user terminal may derive estimates of the two data symbols, $s_1$ and $s_2$, as follows:

$$\hat{s}_1 = \frac{h^*_1 r_1 - h_2 r^*_2}{|h_1|^2 + |h_2|^2} = s_1 + \frac{h^*_1 n_1 - h_2 n^*_2}{|h_1|^2 + |h_2|^2}, \text{ and} \quad \text{Eq (4)}$$

$$\hat{s}_2 = \frac{h^*_2 r_1 + h_1 r^*_2}{|h_1|^2 + |h_2|^2} = s_2 + \frac{h^*_2 n_1 + h_1 n^*_2}{|h_1|^2 + |h_2|^2}.$$

Alternatively, the access point may generate two vectors as $x_1=[s_1 -s^*_2]^T$ and $x_2=[s_2 s^*_1]^T$ and transmit these two vectors sequentially in two OFDM symbol periods. The user terminal may derive estimates of the two data symbols as $\hat{s}_1=(h^*_1 r_1+h_2 r^*_2)/\alpha$ and $\hat{s}_2=(-h_2 r^*_1+h^*_1 r_2)/\alpha$, where $\alpha=|h_1|^2+|h_2|^2$.

The above description may be extended for a system with two or more transmit antennas, multiple receive antennas, and multiple subbands. Two transmit antennas are used for each data subband. Suppose that two data symbols, denoted as $s_1(k)$ and $s_2(k)$, are to be transmitted on a given subband k. The access point generates two vectors $x_1(k)=[s_1(k) s_2(k)]^T$ and $x_2(k)=[s^*_2(k)-s^*_1(k)]^T$ or equivalently two symbol sets $\{x_1(k)\}=\{s_1(k) s^*_2(k)\}$ and $\{x_j(k)\}=\{s_2(k)-s^*_1(k)\}$. Each symbol set includes two transmit symbols that are to be transmitted sequentially in two OFDM symbol periods from a respective antenna on subband k (i.e., symbol set {$x_i(k)$} is transmitted on subband k from antenna i in two OFDM symbol periods, and symbol set {$x_j(k)$} is transmitted on subband k from antenna j in the same two OFDM symbol periods).

If the user terminal is equipped with multiple antennas, then the received symbols may be expressed as:

$$\underline{r}_1(k) = \underline{h}_i(k)s_1(k) + \underline{h}_j(k)s_2(k) + \underline{n}_1(k), \text{ and}$$

$$\underline{r}_2(k) = \underline{h}_i(k)s^*_2(k) - \underline{h}_j(k)s^*_1(k) + \underline{n}_2(k),$$

Eq (5)

where $\underline{r}_1(k)$ and $\underline{r}_2(k)$ are two symbol vectors received in two consecutive OFDM symbol periods on subband k at the user terminal, with each vector including $N_R$ received symbols for $N_R$ receive antennas;

$\underline{h}_i(k)$ and $\underline{h}_j(k)$ are the vectors of path gains for transmit antennas i and j, respectively, for subband k, with each vector including the channel gains from the associated transmit antenna to each of the $N_R$ receive antennas; and $\underline{n}_1(k)$ and $\underline{n}_2(k)$ are the noise vectors for the two received symbol vectors $\underline{r}_1(k)$ and $\underline{r}_2(k)$, respectively.

The user terminal may derive estimates of the two data symbols, $s_1(k)$ and $s_2(k)$, as follows:

$$\hat{s}_1(k) = \frac{\hat{\underline{h}}_i^H(k)\underline{r}_1(k) - \underline{r}_2^H(k)\hat{\underline{h}}_j(k)}{\|\hat{\underline{h}}_i(k)\|^2 + \|\hat{\underline{h}}_j(k)\|^2} = s_1(k) + \frac{\hat{\underline{h}}_i^H(k)\underline{n}_1(k) - \underline{n}_2^H(k)\hat{\underline{h}}_j(k)}{\|\hat{\underline{h}}_i(k)\|^2 + \|\hat{\underline{h}}_j(k)\|^2}, \text{ and}$$

$$\hat{s}_2(k) = \frac{\hat{\underline{h}}_j^H(k)\underline{r}_1(k) + \underline{r}_2^H(k)\hat{\underline{h}}_i(k)}{\|\hat{\underline{h}}_i(k)\|^2 + \|\hat{\underline{h}}_j(k)\|^2} = s_2(k) + \frac{\hat{\underline{h}}_j^H(k)\underline{n}_1(k) + \underline{n}_2^H(k)\hat{\underline{h}}_i(k)}{\|\hat{\underline{h}}_i(k)\|^2 + \|\hat{\underline{h}}_j(k)\|^2}.$$

Eq (6)

Alternatively, the access point may generate two symbol sets $x_i(k) = \{s_1(k)\ s_2(k)\}$ and $x_j(k) = \{-s^*_2(k)\ s^*_1(k)\}$ and transmit these symbol sets from antennas i and j. The user terminal may derive estimates of the two data symbols as $\hat{s}_1(k) = [\hat{\underline{h}}_i^H(k)\underline{r}_1(k) + \underline{r}_2^H(k)\hat{\underline{h}}_j(k)]/\beta$ and $\hat{s}_2(k) = [\hat{\underline{h}}_j^H(k)\underline{r}_2(k) - \underline{r}_1^H(k)\hat{\underline{h}}_j(k)]/\beta$, where $\beta = \|\hat{\underline{h}}_i(k)\|^2 + \|\hat{\underline{h}}_j(k)\|^2$.

The STTD scheme utilizes one pair of transmit antennas for each data subband. If the access point is equipped with two transmit antennas, then both antennas are used for all 48 data subbands of the short OFDM symbol. If the access point is equipped with four transmit antennas, then each antenna is used for half of the 48 data subbands. Table 5 lists an exemplary subband-antenna assignment scheme for the STTD scheme for the short OFDM symbol.

TABLE 5

| Subband Index $k_s$ | Transmit Antennas |
|---|---|
| — | — |
| −26 | 1, 2 |
| −25 | 3, 4 |
| −24 | 1, 3 |
| −23 | 2, 4 |
| −22 | 1, 4 |
| −21 | — |
| −20 | 2, 3 |
| −19 | 1, 2 |
| −18 | 3, 4 |
| −17 | 1, 3 |
| −16 | 2, 4 |
| −15 | 1, 4 |

TABLE 5-continued

| Subband Index $k_s$ | Transmit Antennas |
|---|---|
| −14 | 2, 3 |
| −13 | 1, 2 |
| −12 | 3, 4 |
| −11 | 1, 3 |
| −10 | 2, 4 |
| −9 | 1, 4 |
| −8 | 2, 3 |
| −7 | — |
| −6 | 1, 2 |
| −5 | 3, 4 |
| −4 | 1, 3 |
| −3 | 2, 4 |
| −2 | 1, 4 |
| −1 | 2, 3 |
| 0 | — |
| 1 | 3, 4 |
| 2 | 1, 2 |
| 3 | 2, 4 |
| 4 | 1, 3 |
| 5 | 2, 3 |
| 6 | 1, 4 |
| 7 | — |
| 8 | 3, 4 |

TABLE 5-continued

| Subband Index $k_s$ | Transmit Antennas |
|---|---|
| 9 | 1, 2 |
| 10 | 2, 4 |
| 11 | 1, 3 |
| 12 | 2, 3 |
| 13 | 1, 4 |
| 14 | 3, 4 |
| 15 | 1, 2 |
| 16 | 2, 4 |
| 17 | 1, 3 |
| 18 | 2, 3 |
| 19 | 1, 4 |
| 20 | 3, 4 |
| 21 | — |
| 22 | 1, 2 |
| 23 | 2, 4 |
| 24 | 1, 3 |
| 25 | 2, 3 |
| 26 | 1, 4 |
| — | — |

Figure 5:
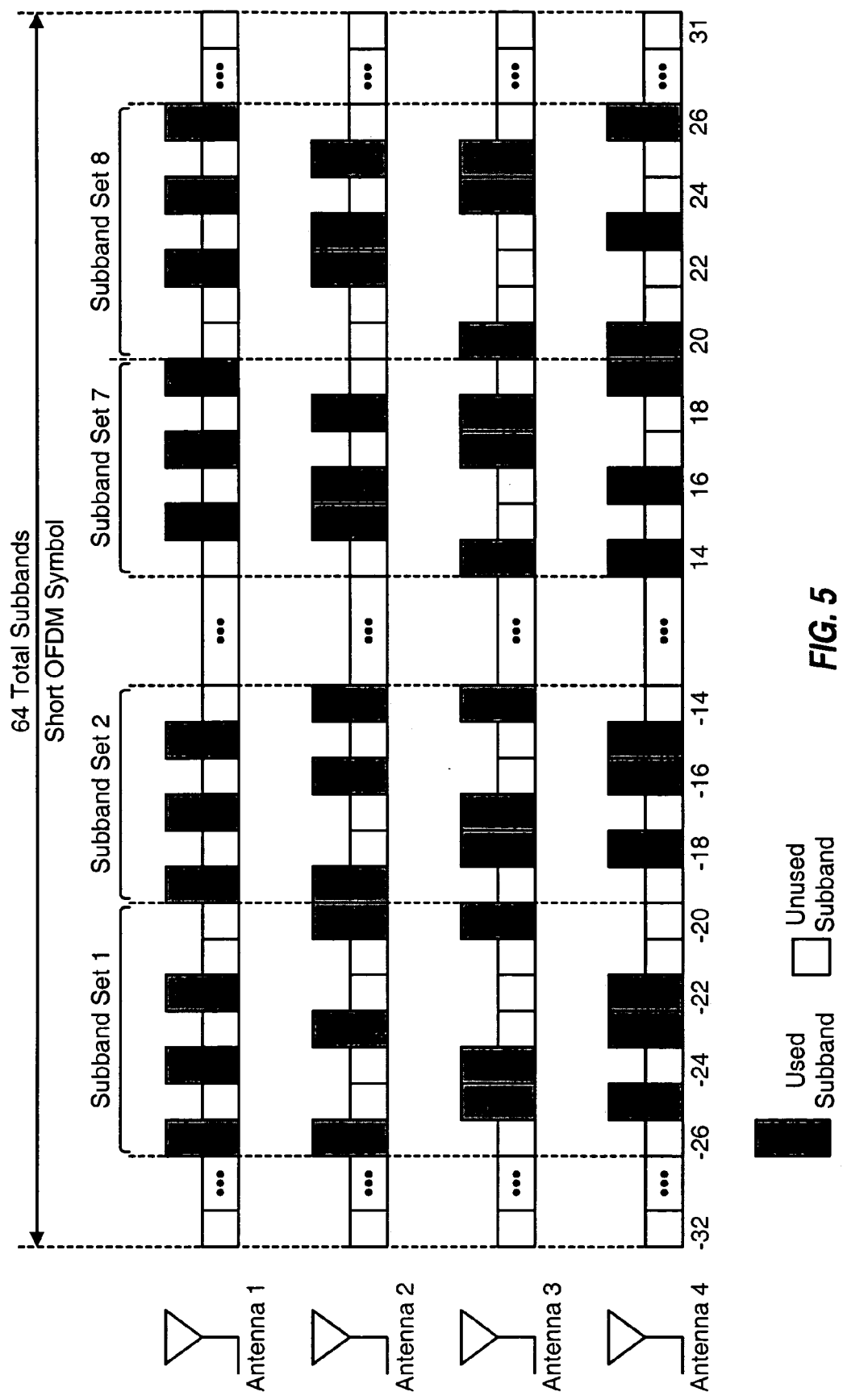
FIG. 5 shows a subband-antenna assignment scheme.

FIG. 5 illustrates the subband-antenna assignment scheme shown in Table 5. For this scheme, transmit antennas 1 and 2 are used for subbands with indices {−26, −19, −13, −6, 2, 9, 15, 22}, transmit antennas 3 and 4 are used for subbands with indices {−25, −18, −12, −5, 1, 8, 14, 20}, and so on. There are six different antenna pairings with four transmit antennas. Each of the six antenna pairings is used for 8 data subbands, which are spaced approximately uniformly across the 48 data subbands. The antenna pairing to subband assignment is such that different antennas are used for adjacent subbands, which may provide greater frequency and spatial diversity. For example, antennas 1 and 2 are used for subband −26, and antennas 3 and 4 are used for subband −25.

The antenna-subband assignment in Table 5 is also such that all four transmit antennas are used for each code bit for the lowest code rate of ¼, which maximizes spatial diversity. For code rate ¼, each code bit is repeated and sent on two subbands that are mapped to two disjoint antenna pairs so that all four antennas are used to transmit that code bit. For example, bit indices 0 and 1 in Table 3 correspond to the same repeated code bit, the code bit with index 0 is transmitted from antennas 1 and 2 on subband −26, and the code bit with index 1 is transmitted from antennas 3 and 4 on subband 1.

The long OFDM symbol is approximately four times the duration of the short OFDM symbol. To minimize processing delay and buffering requirements, space-frequency transmit diversity is used to transmit two long OFDM symbols concurrently on two subbands from two antennas.

An exemplary SFTD scheme for the long OFDM symbol operates as follows. Suppose that two data symbols, denoted as $s(k_l)$ and $s(k_l+1)$, are generated and mapped to two adjacent subbands of a long OFDM symbol. The access point transmits symbols $s(k_l)$ and $s(k_l+1)$ from two antennas on subband $k_l$ and transmits symbols $s^*(k_l+1)$ and $-s^*(k_l)$ from the same two antennas on subband $k_l+1$. Adjacent subbands are used for the pair of data symbols because the channel response is assumed to be approximately constant over the two subbands.

If the access point is equipped with two transmit antennas, then both antennas are used for all 192 data subbands of the long OFDM symbol. If the access point is equipped with four transmit antennas, then the same subband-antenna assignment scheme shown in Table 5 may also be used for the long OFDM symbol. In this case, a subband of index $k_l$ for the long OFDM symbol is first mapped to a corresponding subband of index $k_s$ for the short OFDM symbol, as follows:

$$k_s = \left\lfloor \frac{k_l + sgn(k_l) \cdot k_{os}}{4} \right\rfloor, \quad \text{Eq (7)}$$

where $\lfloor z \rfloor$ is a floor operator that provides the nearest lower integer for z, and $k_{os}$ is the subband index offset for long OFDM subband index $k_l$ ($k_{os} \in \{0, 1, 2, 3\}$).

The antenna pair corresponding to the mapped short OFDM symbol subband index $k_s$ is determined from Table 5 and used for the long OFDM symbol subband with index $k_l$.

For the SFTD scheme, the processing at the user terminal to obtain estimates of the two data symbols can be performed as shown in equations (4) and (6). However, the computation is performed on received symbols obtained on two subbands instead of two OFDM symbol periods.

Figure 6:
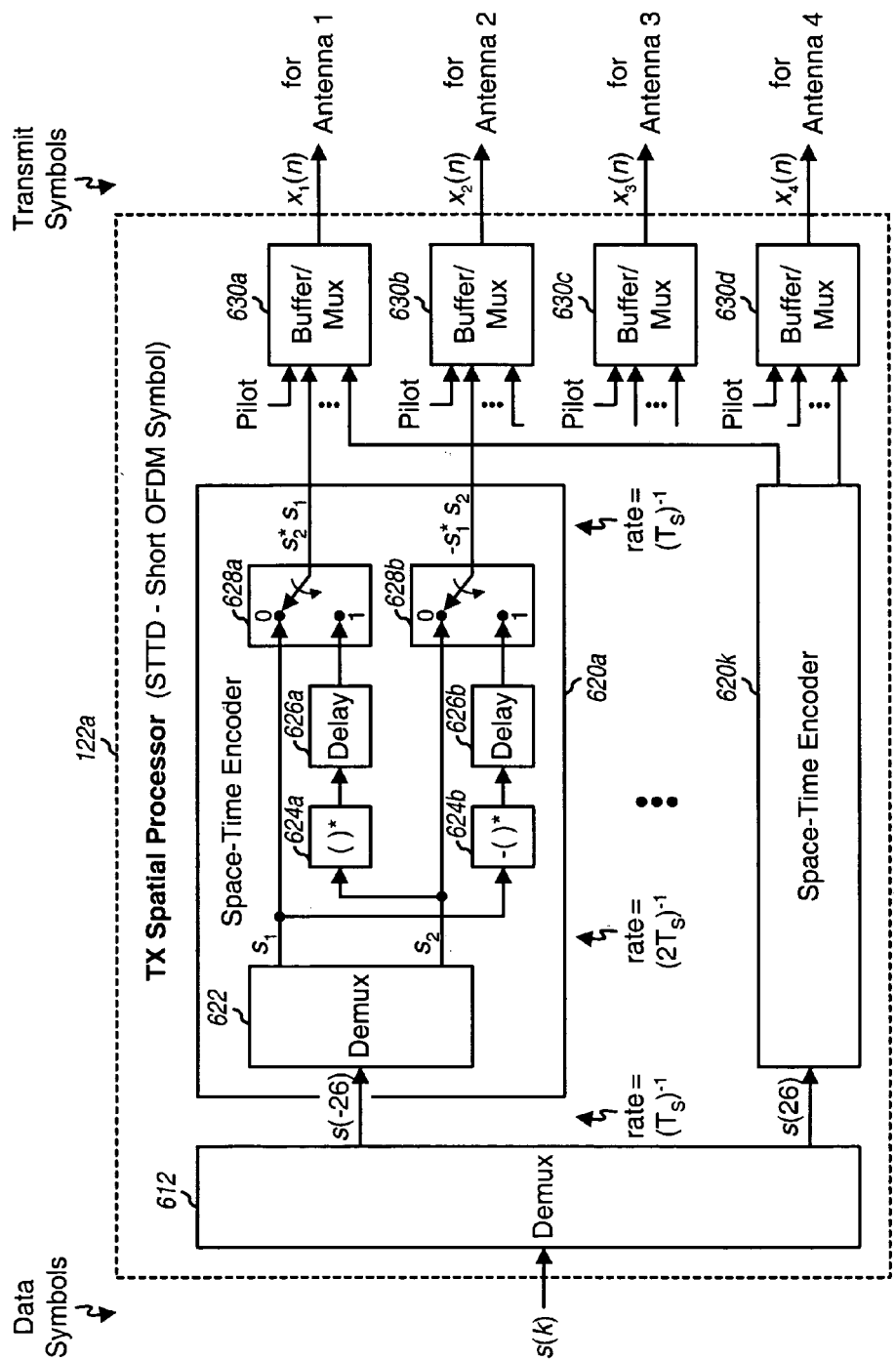
FIG. 6 shows a transmit (TX) spatial processor for the STTD scheme.

FIG. 6 shows a block diagram of a TX spatial processor 122a, which implements the STTD scheme for the short OFDM symbol. TX spatial processor 122a is one embodiment of TX spatial processor 122 in FIG. 1.

Within TX spatial processor 122a, a demultiplexer 612 receives a stream of data symbols, $\{s(k)\}$, from TX data processor 120, demultiplexes the stream into 48 data symbol substreams for the 48 data subbands of the short OFDM symbol, and provides each substream to a respective space-time encoder 620. Each substream includes one data symbol for each short OFDM symbol period, which corresponds to a symbol rate of $T_S^{-1}$, where $T_S$ is the duration of one short OFDM symbol.

Within each space-time encoder 620, a demultiplexer 622 demultiplexes the data symbol substream into two symbol sequences, with each sequence having a symbol rate of $(2T_S)^{-1}$. The first symbol sequence is provided to a "0" input of a switch 628a and a unit 624b, which inverts and conjugates each symbol in the sequence. The second symbol sequence is provided to a "0" input of a switch 628b and a unit 624a, which conjugates each symbol in the sequence. A delay unit 626a delays the symbols from unit 624a by one short OFDM symbol period and provides the delayed symbols to a "1" input of switch 628a. A delay unit 626b delays the symbols from unit 624b by one short OFDM symbol period and provides the delayed symbols to a "1" input of switch 628b. Switch 628a toggles at the short OFDM symbol rate and provides symbol set $\{x_i(k)\} = \{s_1(k)\ s^*_2(k)\}$ for one transmit antenna for each two OFDM symbol periods. Similarly, switch 628b toggles at the short OFDM symbol rate and provides symbol set $\{x_j(k)\} = \{s_2(k) -s^*_1(k)\}$ for another transmit antenna for each two OFDM symbol periods.

Buffers/multiplexers 630a through 630d buffer and multiplex the transmit symbols from space-time encoders 620. Each buffer/multiplexer 630 receives pilot symbols and transmit symbols from the appropriate space-time encoders 620, as determined by Table 5. In particular, buffer/multiplexer 630a receives transmit symbols for all subbands mapped to antenna 1 (e.g., subbands −26, −24, −22, −19, and so on), buffer/multiplexer 630b receives transmit symbols for all subbands mapped to antenna 2 (e.g., subbands −26, −23, −20, −19, and so on), buffer/multiplexer 630c receives transmit symbols for all subbands mapped to antenna 3 (e.g., subbands −25, −24, −20, −18, and so on), and buffer/multiplexer 630d receives transmit symbols for all subbands mapped to antenna 4 (e.g., subbands −25, −23, −22, −18, and so on).

Each buffer/multiplexer 630 then, for each short OFDM symbol period, multiplexes four pilot symbols for the four pilot subbands, 24 transmit symbols for 24 data subbands, and 36 signal values of zero (or "zero" symbols) for 36 unused subbands to form a sequence of 64 transmit symbols for the 64 total subbands. Although there are 48 data subbands for the short OFDM symbol, only 24 subbands are used for each transmit antenna for the STTD scheme because only two antennas are used for each subband, and the effective number of unused subbands for each antenna is thus 36 instead of 12. Each transmit symbol in the sequence may be a transmit symbol from encoder 620, a pilot symbol, or a zero symbol and is sent on one subband in one short OFDM symbol period. Each buffer/multiplexer 630 provides a stream of transmit symbols $\{x_i(k)\}$ for one transmit antenna. Each transmit symbol stream contains concatenated sequences of 64 transmit symbols, one sequence for each OFDM symbol period.

Figure 7:
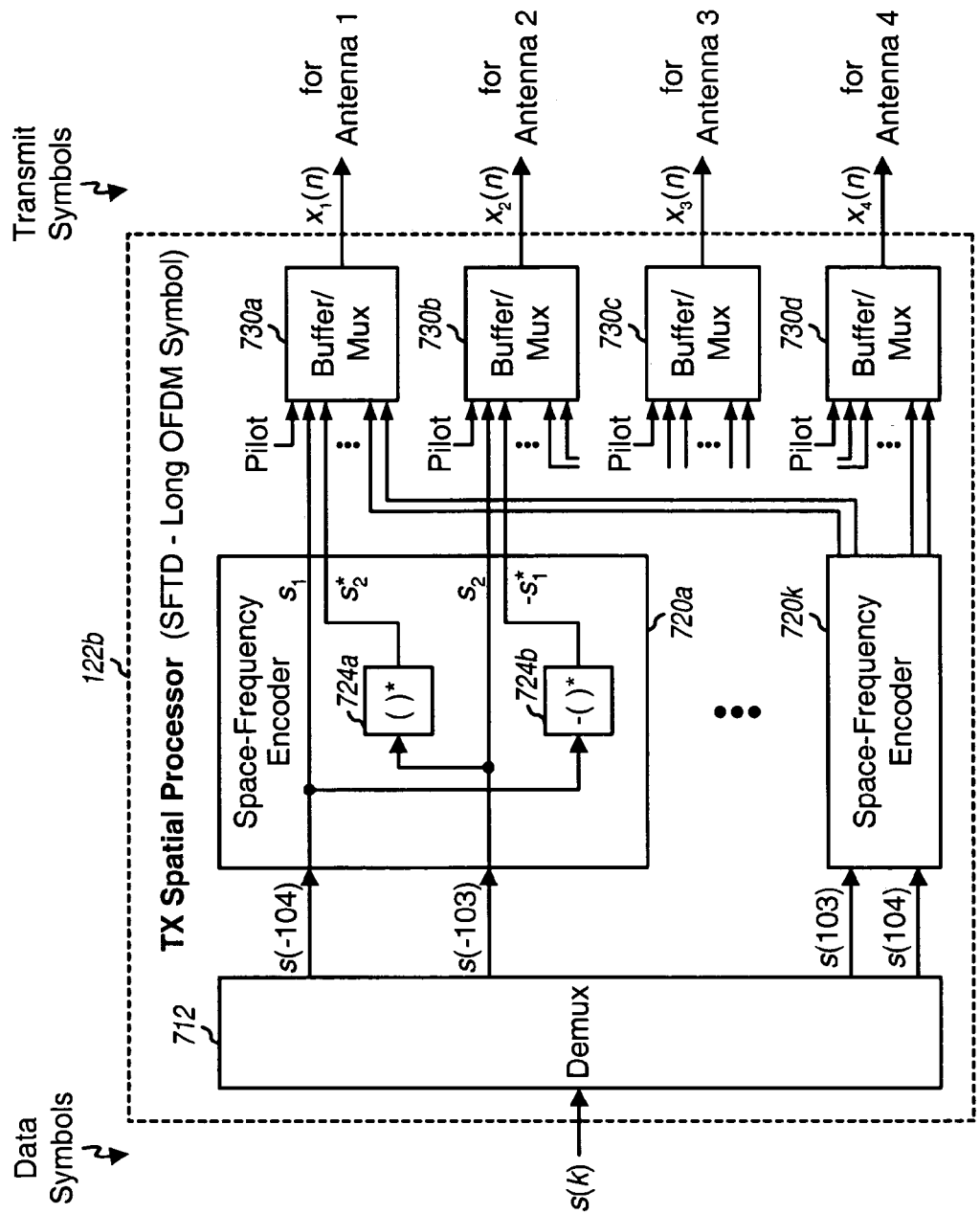
FIG. 7 shows a TX spatial processor for the SFTD scheme.

FIG. 7 shows a block diagram of a TX spatial processor 122b, which implements the SFID scheme for the long OFDM symbol. TX spatial processor 122b is another embodiment of TX spatial processor 122 in FIG. 1.

Within TX spatial processor 122b, a demultiplexer 712 receives a stream of data symbols, $\{s(k)\}$, from TX data processor 120, demultiplexes the stream into 192 data symbol substreams for the 192 data subbands of the long OFDM symbol, and provides each pair of substreams to a respective space-frequency encoder 720. Each substream includes one data symbol for each long OFDM symbol period, which corresponds to a symbol rate of $T_L^{-1}$, where $T_L$ is the duration of one long OFDM symbol.

Each space-frequency encoder 720 receives a pair of data symbol substreams for two subbands $k_l$ and $k_l+1$. Within each encoder 720, a unit 724*a* conjugates each symbol in the substream for subband $k_l+1$, and a unit 724*b* inverts and conjugates each symbol in the substream for subband $k_l$. Each encoder 720 provides (1) the two data symbol substreams to two buffers/multiplexers 730 for two associated antennas for transmission on subband $k_l$ and (2) the two substreams from units 724*a* and 724*b* to the same two antennas for transmission on subband $k_l+1$. The symbol rate for all substreams into and out of each space-frequency encoder 720 is $T_L^{-1}$.

Each buffer/multiplexer 730 receives pilot symbols and transmit symbols from the appropriate space-frequency encoders 720, as determined by equation (7) and Table 5. In particular, buffers/multiplexers 730*a*, 730*b*, 730*c*, and 730*d* receive transmit symbols for all subbands mapped to antennas 1, 2, 3, and 4, respectively. Each buffer/multiplexer 730 then, for each long OFDM symbol period, multiplexes 16 pilot symbols for the 16 pilot subbands, 192 transmit symbols for 192 data subbands, and 48 zero symbols for 48 unused subbands to form a sequence of 256 transmit symbols for the 256 total subbands. For the SFTD scheme, all 192 data subbands are used for data transmission. Each buffer/multiplexer 730 provides a stream of transmit symbols $\{x_t(k)\}$ for one transmit antenna.

Figure 8:
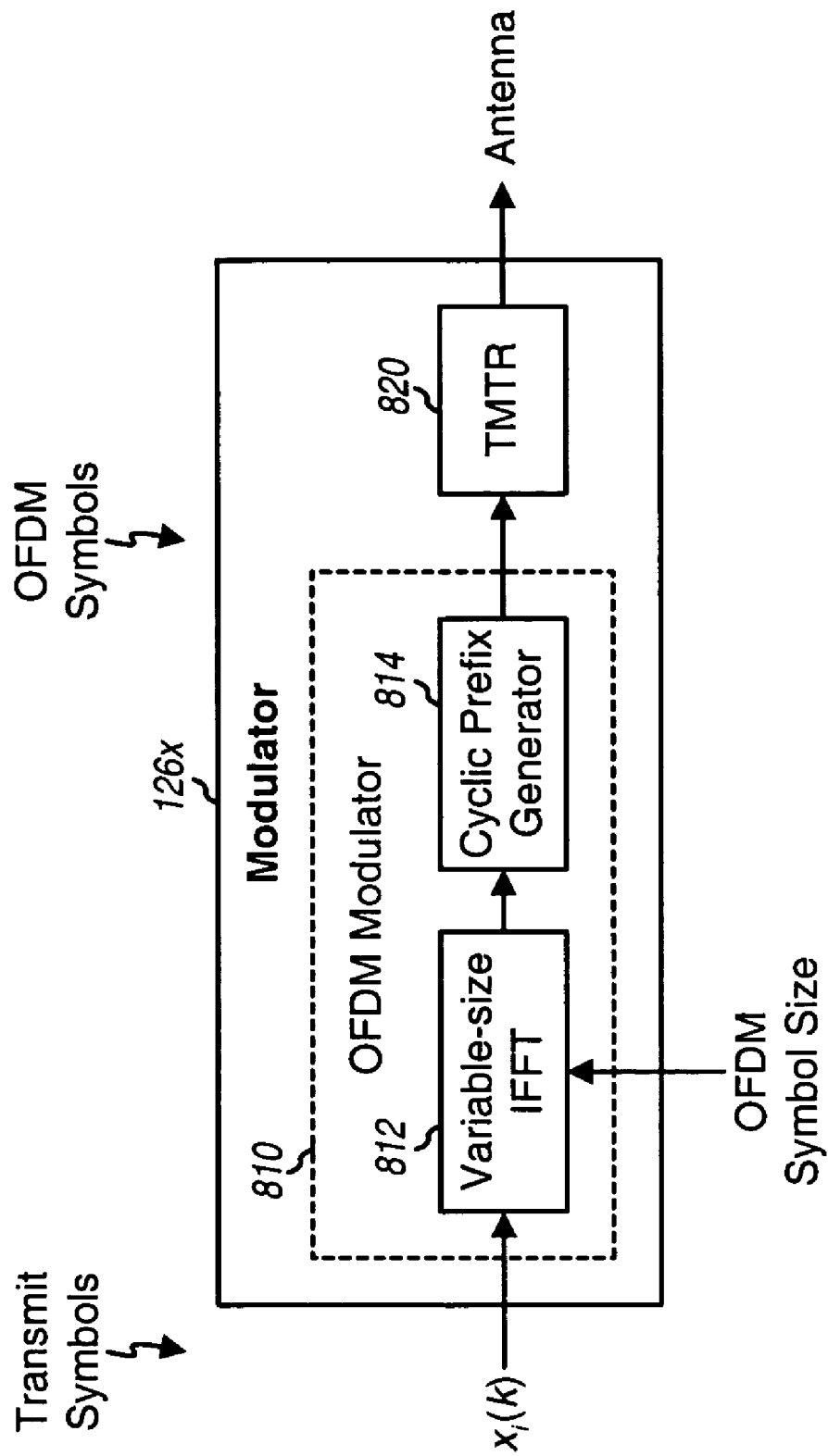
FIG. 8 shows a modulator.

FIG. 8 shows a block diagram of an embodiment of a modulator 126*x*, which may be used for each of modulators 126*a* through 126*d* in FIG. 1. Modulator 126*x* includes an OFDM modulator 810 coupled to a transmitter unit (TMTR) 820. OFDM modulator 810 includes a variable-size inverse fast Fourier transform (IFFT) unit 812 and a cyclic prefix generator 814. IFFT unit 812 receives a stream of transmit symbols, $\{x_t(k)\}$, performs an L-point IFFT on each sequence of L transmit symbols in the stream $\{x_t(k)\}$, and provides a corresponding sequence of L time-domain chips for a transformed symbol. The OFDM symbol size L is indicated by a control signal provided by controller 130 and is L=64 for the short OFDM symbol and L=256 for the long OFDM symbol. Cyclic prefix generator 814 repeats a portion of each transformed symbol from IFFT unit 812 to form a corresponding OFDM symbol. An OFDM symbol period corresponds to the duration of one OFDM symbol. The output of cyclic prefix generator 814 is a stream of OFDM symbols having sizes determined by the control signal. Transmitter unit 820 converts the stream of OFDM symbols into one or more analog signals, and further conditions (e.g., amplifies, filters, and frequency upconverts) the analog signals to generate a downlink signal suitable for transmission from an associated antenna 128*x*.

Figure 9:
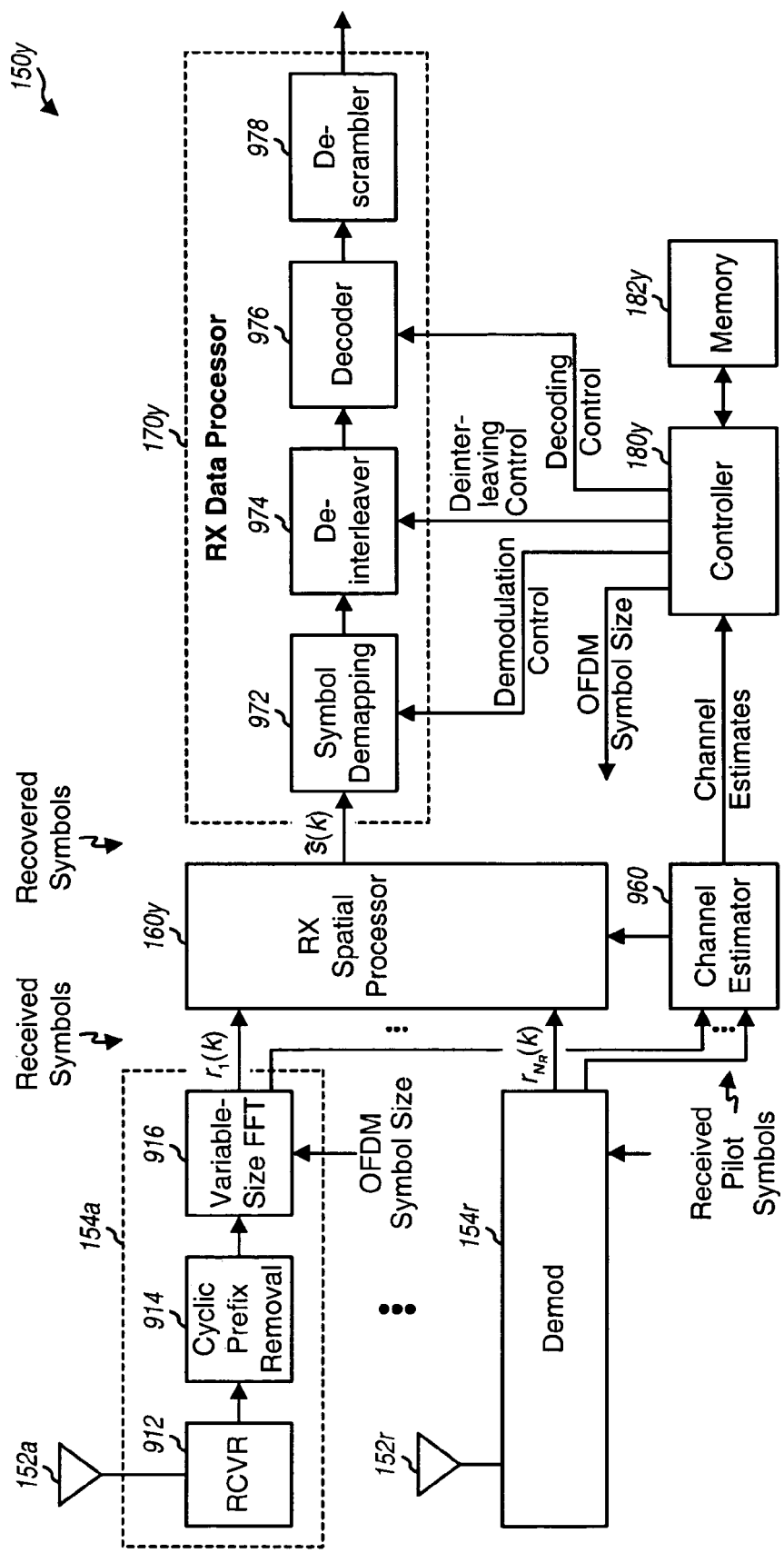
FIG. 9 shows a user terminal with multiple antennas.

FIG. 9 shows a block diagram of user terminal 150*y* with multiple ($N_R>1$) antennas. The downlink signals from access point 110 are received by each of antennas 152*a* through 152*r*. Each antenna provides a received signal to a respective demodulator 154.

Within each demodulator 154, a receiver unit (RCVR) 912 conditions (e.g., frequency downconverts, amplifies, and filters) and digitizes its received signal and provides a stream of samples to an OFDM demodulator. The OFDM demodulator includes a cyclic prefix removal unit 914 and a variable-size fast Fourier transform (FFT) unit 916. Unit 914 removes the cyclic prefix in each OFDM symbol and provides a corresponding received transformed symbol that contains L samples, where L is dependent on the OFDM symbol size. Variable-size FFT unit 916 receives the stream of samples from unit 914, performs an L-point FFT on each sequence of L samples in the stream for a received transformed symbol, and provides a corresponding sequence of L received symbols for the transformed symbol. Demodulators 154*a* through 154*r* provide $N_R$ streams of received symbols (for data) to RX spatial processor 160*y* and received pilot symbols to a channel estimator 960.

RX spatial processor 160*y* performs spatial processing on the $N_R$ streams of received symbols with channel gain estimates from channel estimator 960, e.g., as shown in equation (6). RX spatial processor 160*y* provides to RX data processor 170*y* a stream of recovered data symbols, $\{\hat{s}(k)\}$, which is an estimate of the stream of data symbols, $\{s(k)\}$, transmitted by access point 110.

Within RX data processor 170*y*, a symbol demapping unit 972 demodulates the recovered data symbols in accordance with the modulation scheme used for the data stream, as indicated by a demodulation control provided by controller 180*y*. A channel deinterleaver 974 then deinterleaves the demodulated data in a manner complementary to the interleaving performed at access point 110, as indicated by a deinterleaving control provided by controller 180*y*. For the short OFDM symbol, the deinterleaving is performed across 48 data subbands for each short OFDM symbol, complementary to the interleaving described above. For the long OFDM symbol, the deinterleaving is performed across each of the four blocks of 48 data subbands, as also described above. A decoder 976 then decodes the deinterleaved data in a manner complementary to the encoding performed at access point 110, as indicated by a decoding control provided by controller 180*y*. A Viterbi decoder may be used for decoder 976 for the convolutional coding scheme described above. A descrambler 978 descrambles the decoded data in a complementary manner to the scrambling performed at access point 110. Although not shown in FIG. 9, a CRC checker may check each packet based on the CRC value included in the packet to determine whether the packet was received correctly or in error. The packet status may be used to initiate retransmission of packets received in error by user terminal 150*y*.

Channel estimator 960 estimates various channel characteristics (e.g., the path gains and noise variance) based on received pilot symbols. Channel estimator 960 provides a vector of path gain estimates, $\hat{h}_i(k)$, for each access point antenna to RX spatial processor 160*y*, which uses these path gain estimates to recover the transmitted data symbols, as shown in equation (6). Channel estimator 960 also provides the channel estimates to controller 180*y*. Controller 180*y* may perform various functions related to transmit diversity processing at user terminal 150*y*. Controller 180*y* may also select the proper rate and OFDM symbol size to use for data transmission based on the channel estimates and/or other considerations.

For user terminal 150*x* equipped with a single antenna 152*x*, demodulator 154*x* provides one stream of received symbols. RX spatial processor 160*x* performs spatial processing on the stream of received symbols with channel gain estimates (e.g., as shown in equation (4)) and provides a stream of recovered data symbols, $\{\hat{s}(k)\}$. RX data processor 170*x* then symbol demaps, deinterleaves, decodes, and descrambles the recovered data symbol stream in the manner as described above for user terminal 150*y*.

For clarity, the transmit diversity processing techniques have been described above for the downlink in an exemplary multi-antenna OFDM system. These techniques can also be used for the uplink by user terminals equipped with multiple antennas. Also for clarity, these techniques have been described for an OFDM system. The OFDM system can support one OFDM symbol size, two OFDM symbol sizes (as described above), or more than two OFDM symbol sizes. Many of these techniques may also be used for a single-carrier multi-antenna system.

Figures 10, 11:
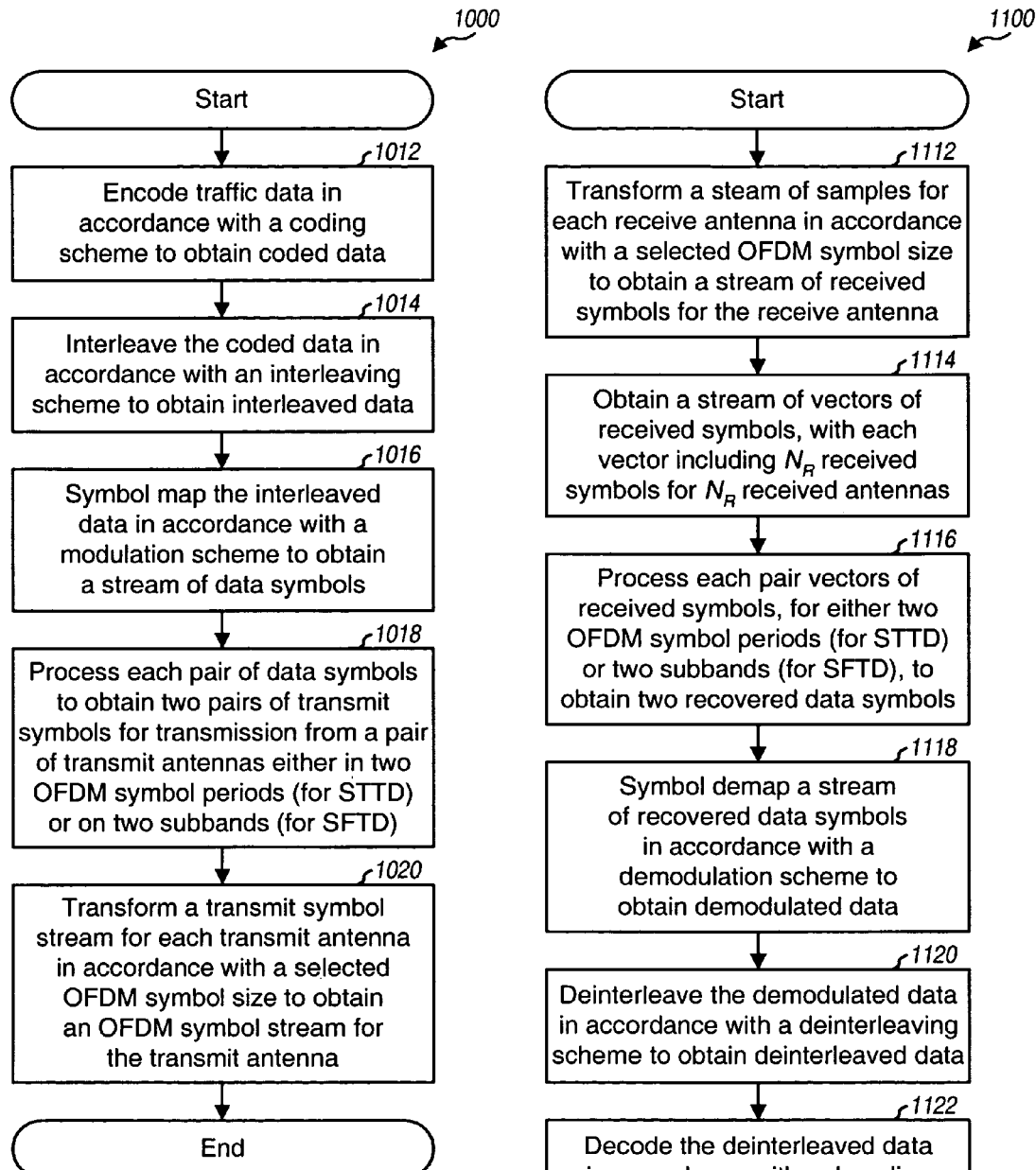
FIG. 10 shows a process for performing transmit diversity processing at a transmitter.
FIG. 11 shows a process for performing data reception with transmit diversity at a receiver.

FIG. 10 shows a flow diagram of a process 1000 for performing transmit diversity processing at a transmitter in a multi-antenna OFDM system. The transmitter encodes traffic data in accordance with a coding scheme to obtain coded data (block 1012). The coding scheme may comprise a fixed rate base code and a set of repetition and/or puncturing patterns for a set of code rates supported by the system. The transmitter then interleaves the coded data in accordance with an interleaving scheme to obtain interleaved data (block 1014). The transmitter next symbol maps the interleaved data in accordance with a modulation scheme to obtain a stream of data symbols (block 1016). The transmitter then processes each pair of data symbols to obtain two pairs of transmit symbols for transmission from a pair of transmit antennas (block 1018). Each transmit symbol is a version of a data symbol. The two pairs of transmit symbols may be transmitted from the pair of antennas either in two OFDM symbol periods or on two subbands. If $N_T$ transmit antennas are available for data transmission, then $N_T \cdot (N_T-1)/2$ different pairs of antennas may be used to transmit the data symbols. If the system supports multiple OFDM symbol sizes, then the transmitter transforms (e.g., performs OFDM modulation on) the stream of transmit symbols for each transmit antenna in accordance with a selected OFDM symbol size to obtain a corresponding stream of OFDM symbols for the transmit antenna (block 1020).

FIG. 11 shows a flow diagram of a process 1100 for performing data reception with transmit diversity at a receiver in the multi-antenna OFDM system. The receiver transforms a stream of samples for each of $N_R$ receive antennas in accordance with a selected OFDM symbol size to obtain a corresponding stream of received symbols for the receive antenna, where $N_R \geq 1$ (block 1112). The receiver obtains a stream of vectors of received symbols, where each vector includes $N_R$ received symbols for $N_R$ antennas and is for one subband in one OFDM symbol period (block 1114). The receiver processes each pair of vectors of received symbols with channel estimates to obtain two recovered data symbols, as shown in equation (4) or (6) (block 1116). The two vectors are for two OFDM symbol periods for the STTD scheme and for two subbands for the SFTD scheme. A stream of recovered data symbols is obtained for the stream of vectors of received symbols. The receiver then symbol demaps the stream of recovered data symbols in accordance with a demodulation scheme to obtain demodulated data (block 1118), deinterleaves the demodulated data in accordance with a deinterleaving scheme to obtain deinterleaved data (block 1120), and decodes the deinterleaved data in accordance with a decoding scheme to obtain decoded data (block 1122). The demodulation, deinterleaving, and decoding schemes are complementary to the modulation, interleaving, and coding schemes, respectively, used at the transmitter.

The transmit diversity processing techniques described herein may be implemented by various means. For example, these techniques may be implemented in hardware, software, or a combination thereof. For a hardware implementation, the processing units used to perform transmit diversity processing at each of the access point and the user terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the transmit diversity processing techniques may be implemented with modules (e.g., procedures, functions, and so on) that perform the functions described herein. The software codes may be stored in a memory unit (e.g., memory unit 132, 182x, or 182y in FIG. 1) and executed by a processor (e.g., controller 130, 180x, or 180y). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing data for transmission in a wireless multi-antenna orthogonal frequency division multiplexing (OFDM) communication system, the method comprising:
    coding traffic data in accordance with a coding scheme to obtain coded data;
    interleaving the coded data in accordance with an interleaving scheme to obtain interleaved data;
    symbol mapping the interleaved data in accordance with a modulation scheme to obtain a stream of data symbols;
    forming at least one pair of data symbols from the stream of data symbols; and
    processing each pair of data symbols to obtain two pairs of transmit symbols for transmission from a pair of antennas, wherein each transmit symbol is a version of a data symbol, and further wherein the two pairs of transmit symbols are to be transmitted over at least one OFDM subband, and also further wherein the OFDM communication system is capable of adjusting the total number of available subbands.

2. The method of claim 1, wherein the two pairs of transmit symbols for each pair of data symbols are transmitted from a pair of antennas on the same subband in two OFDM symbol periods.

3. The method of claim 1, wherein the two pairs of transmit symbols for each pair of data symbols are transmitted from a pair of antennas on two subbands in one OFDM symbol period.

4. The method of claim 1, wherein $N_T$ antennas are available for data transmission and $N_T \cdot (N_T-1)/2$ different pairs of antennas are used to transmit pairs of data symbols in the stream, where $N_T \geq 2$.

5. The method of claim 1, wherein a plurality of subbands are used for data transmission, and wherein different pairs of antennas are used for adjacent subbands used for data transmission.

6. The method of claim 1, wherein the system supports a first OFDM symbol size with S subbands and a second OFDM symbol size with L subbands, where S is an integer greater than one and L is an integer multiple of S.

7. The method of claim 6, further comprising:
forming a plurality of streams of transmit symbols for a plurality of antennas; and
transforming each stream of transmit symbols in accordance with the first or second OFDM symbol size to obtain a corresponding stream of OFDM symbols.

8. The method of claim 1, wherein the coding includes:
coding the traffic data in accordance with a base code to obtain code bits at a fixed code rate, and
puncturing the code bits at the fixed code rate to obtain the coded data comprised of code bits at one of a plurality of code rates supported by the system.

9. The method of claim 8, wherein the base code is a rate ½ convolutional code.

10. The method of claim 8, wherein the plurality of code rates are associated with a plurality of puncturing patterns.

11. The method of claim 1, wherein the coding includes:
coding the traffic data in accordance with a base code to obtain code bits at a fixed code rate, and
repeating the code bits at the fixed code rate to obtain the coded data comprised of code bits at a lower code rate than the fixed code rate.

12. The method of claim 1, wherein the interleaving includes:
forming sequences of code bits from the coded data, and
for each of the sequences, mapping each code bit in the sequence to one of a plurality of subbands based on the interleaving scheme.

13. The method of claim 12, wherein each sequence of code bits is designated for transmission on the plurality of subbands in one OFDM symbol period.

14. The method of claim 1, wherein the interleaving includes:
forming sequences of code bits from the coded data,
partitioning each of the sequences into M blocks of code bits for transmission on M disjoint groups of subbands, one block of code bits for each group of subbands, where $M \geq 2$, and
for each of the M blocks for each sequence, mapping each code bit in the block to one of the subbands in the group for the block based on the interleaving scheme.

15. The method of claim 1, wherein the symbol mapping includes grouping sets of B bits in the interleaved data to form B-bit binary values, where $B \geq 1$, and
mapping each of the B-bit binary values to a data symbol based on the modulation scheme, wherein the modulation scheme is defined with Gray mapping such that two adjacent data symbols in a signal constellation for the modulation scheme differ by at most one bit among B bits.

16. The method of claim 15, wherein the symbol mapping further includes
reordering the B bits for each of the sets, and wherein the sets of reordered B bits are used to form the B-bit binary values.

17. A transmitter in a wireless multi-antenna orthogonal frequency division multiplexing (OFDM) communication system, comprising:
an encoder operative to encode traffic data in accordance with a coding scheme to obtain coded data;
an interleaver operative to interleave the coded data in accordance with an interleaving scheme to obtain interleaved data;
a symbol mapping unit operative to symbol map the interleaved data in accordance with a modulation scheme to obtain a stream of data symbols; and
a transmit spatial processor operative to form at least one pair of data symbols from the stream of data symbols and process each pair of data symbols to obtain two pairs of transmit symbols for transmission from a pair of antennas, wherein each transmit symbol is a version of a data symbol, and further wherein the two pairs of transmit symbols are to be transmitted over at least one OFDM subband, and also further wherein the OFDM communication system is capable of adjusting the total number of available subbands.

18. The transmitter of claim 17, wherein the transmit spatial processor is operative to implement space-time transmit diversity and provide the two pairs of transmit symbols for each pair of data symbols in two OFDM symbol periods.

19. The transmitter of claim 17, wherein the transmit spatial processor is operative to implement space-frequency transmit diversity and provide the two pairs of transmit symbols for each pair of data symbols on two subbands.

20. The transmitter of claim 17, wherein the system supports a first OFDM symbol size with S subbands and a second OFDM symbol size with L subbands, where S is an integer greater than one and L is an integer multiple of S.

21. The transmitter of claim 20, further comprising:
a plurality of modulators for a plurality of antennas, each modulator operative to transform a stream of transmit symbols for an associated antenna to obtain a corresponding steam of OFDM symbols for the antenna.

22. An apparatus in a wireless multi-antenna orthogonal frequency division multiplexing (OFDM) communication system, comprising:
means for coding traffic data in accordance with a coding scheme to obtain coded data;
means for interleaving the coded data in accordance with an interleaving scheme to obtain interleaved data;
means for symbol mapping the interleaved data in accordance with a modulation scheme to obtain a stream of data symbols;
means for forming at least one pair of data symbols from the stream of data symbols; and
means for processing each pair of data symbols to obtain two pairs of transmit symbols for transmission from a pair of antennas, wherein each transmit symbol is a version of a data symbol, and further wherein the two pairs of transmit symbols are to be transmitted over at least one OFDM subband, and also further wherein the OFDM communication system is capable of adjusting the total number of available subbands.

23. The apparatus of claim 22, wherein the two pairs of transmit symbols for each pair of data symbols are transmitted from a pair of antennas in two OFDM symbol periods.

24. The apparatus of claim 22, wherein the two pairs of transmit symbols for each pair of data symbols are transmitted from a pair of antennas on two subbands.

25. The apparatus of claim 22, wherein the system supports a first OFDM symbol size with S subbands and a second OFDM symbol size with L subbands, where S is an integer greater than one and L is an integer multiple of S.

26. The apparatus of claim 25, further comprising:
means for forming a plurality of streams of transmit symbols for a plurality of antennas; and means for transforming each stream of transmit symbols in accordance with the first or second OFDM symbol size to obtain a corresponding stream of OFDM symbols.

27. A method of processing data for transmission in a wireless multi-antenna communication system, the method comprising:
   coding traffic data in accordance with a coding scheme to obtain coded data;
   interleaving the coded data in accordance with an interleaving scheme to obtain interleaved data;
   symbol mapping the interleaved data in accordance with a modulation scheme to obtain a stream of data symbols; and
   forming at least one pair of data symbols from the stream of data symbols; and
   demultiplexing the stream of data symbols such that each pair of data symbols is transmitted from a pair of antennas and consecutive pairs of data symbols are transmitted from different pairs of antennas, and further wherein the two pairs of transmit symbols are to be transmitted over at least one OFDM subband, and also further wherein the OFDM communication system is capable of adjusting the total number of available subbands.

28. The method of claim 27, wherein the demultiplexing is further such that each code bit of the coded data is transmitted from a maximum number of antennas achievable for the code bit based on a code rate of the code bit.

29. The method of claim 27, wherein the MIMO system implements orthogonal frequency division multiplexing (OFDM).

30. The method of claim 29, wherein each pair of data symbols in the stream is transmitted from a pair of antennas on one subband, and wherein pairs of data symbols for adjacent subbands are transmitted on different pairs of antennas.

31. The method of claim 29, wherein each group of S code bits for the coded data is interleaved, where S is the number of subbands used for data transmission.

32. A method of processing data for transmission in a wireless multi-antenna orthogonal frequency division multiplexing (OFDM) communication system, the method comprising:
   coding traffic data in accordance with a coding scheme to obtain coded data;
   interleaving the coded data in accordance with an interleaving scheme to obtain interleaved data;
   symbol mapping the interleaved data in accordance with a modulation scheme to obtain a stream of data symbols;
   forming at least one pair of data symbols from the stream of data symbols; and
   demultiplexing the stream of data symbols such that each pair of data symbols is transmitted from a pair of antennas on two subbands, and further wherein the OFDM communication system is capable of adjusting the total number of available subbands.

33. The method of claim 32, wherein each pair of data symbols in the stream is transmitted on two adjacent subbands usable for data transmission.

34. The method of claim 32, further comprising:
   processing each pair of data symbols in the stream to obtain first and second pairs of transmit symbols, each transmit symbol being a version of one of the data symbols in the pair of data symbols, wherein the first pair of transmit symbols is transmitted from the pair of antennas on a first subband and the second pair of transmit symbols is transmitted from the pair of antennas on a second subband.

35. The method of claim 34, wherein the first and second pairs of transmit symbols are transmitted concurrently in one OFDM symbol period on the first and second subbands, respectively.

36. A method of processing data at a receiver in a wireless multi-antenna orthogonal frequency division multiplexing (OFDM) communication system, the method comprising:
   obtaining a stream of vectors of received symbols, each vector including N received symbols for N receive antennas, where N is one or greater;
   forming at least one pair of vectors from the stream of vectors of received symbols;
   processing each pair of vectors to obtain two recovered data symbols, which are estimates of two data symbols transmitted as two pairs of transmit symbols from two transmit antennas, each transmit symbol being a version of a data symbol, wherein a stream of recovered data symbols is obtained for the stream of vectors of received symbols, and further wherein the two pairs of transmit symbols are transmitted over at least one OFDM subband, and also further wherein the OFDM communication system is capable of adjusting the total number of available subbands;
   symbol demapping the stream of recovered data symbols in accordance with a demodulation scheme to obtain demodulated data;
   deinterleaving the demodulated data in accordance with a deinterleaving scheme to obtain deinterleaved data; and
   decoding the deinterleaved data in accordance with a decoding scheme to obtain decoded data.

37. The method of claim 36, wherein each pair of vectors of received symbols is for two OFDM symbol periods.

38. The method of claim 36, wherein each pair of vectors of received symbols is for two subbands.

39. The method of claim 36, wherein the system supports a first OFDM symbol size with S subbands and a second OFDM symbol size with L subbands, where S is an integer greater than one and L is an integer multiple of S.

40. The method of claim 39, further comprising:
   transforming a stream of samples for each of the N receive antennas in accordance with the first or second OFDM symbol size to obtain a corresponding stream of received symbols for the receive antenna, and wherein the stream of vectors of received symbols is obtained from N streams of received symbols for the N receive antennas.

41. The method of claim 36, wherein N=1 and each vector includes one received symbol for one receive antenna.

42. The method of claim 36, wherein N>1 and each vector includes multiple received symbols for multiple receive antennas.

43. A receiver in a wireless multi-antenna orthogonal frequency division multiplexing (OFDM) communication system, comprising:
   a receive spatial processor operative to receive a stream of vectors of received symbols, form at least one pair of vectors from the stream of vectors of received symbols, and process each pair of vectors to obtain two recovered data symbols, which are estimates of two data symbols transmitted as two pairs of transmit symbols from two transmit antennas, each transmit symbol being a version of a data symbol, wherein each vector includes N received symbols for N receive antennas, where N is one or greater, and wherein a stream of recovered data symbols is obtained for the stream of vectors of received symbols, and further wherein the two pairs of transmit symbols are transmitted over at least one OFDM subband, and also further wherein the OFDM communication system is capable of adjusting the total number of available subbands;

a symbol demapping unit operative to symbol demap the stream of recovered data symbols in accordance with a demodulation scheme to obtain demodulated data;

a deinterleaver operative to deinterleave the demodulated data in accordance with a deinterleaving scheme to obtain deinterleaved data; and a decoder operative to decode the deinterleaved data in accordance with a decoding scheme to obtain decoded data.

44. The receiver of claim 43, wherein each pair of vectors of received symbols is for two OFDM symbol periods.

45. The receiver of claim 43, wherein each pair of vectors of received symbols is for two subbands.

46. The receiver of claim 43, wherein the system supports a first OFDM symbol size with S subbands and a second OFDM symbol size with L subbands, where S is an integer greater than one and L is an integer multiple of S.

47. The receiver of claim 46, further comprising:

N demodulators for the N receive antennas, each demodulator operative to transform a stream of samples for an associated receive antenna in accordance with the first or second OFDM symbol size to obtain a corresponding stream of received symbols for the receive antenna, and wherein the steam of vectors of received symbols is obtained from N streams of received symbols for the N receive antennas.

48. An apparatus in a wireless multi-antenna orthogonal frequency division multiplexing (OFDM) communication system, comprising:

means for obtaining a stream of vectors of received symbols, each vector including N received symbols for N receive antennas, where N is one or greater;

means for forming at least one pair of vectors from the stream of vectors of received symbols;

means for processing each pair of vectors to obtain two recovered data symbols, which are estimates of two data symbols transmitted as two pairs of transmit symbols from two transmit antennas, each transmit symbol being a version of a data symbol, wherein a stream of recovered data symbols is obtained for the stream of vectors of received symbols, and further wherein the two pairs of transmit symbols transmitted over at least one OFDM subband, and also further wherein the OFDM communication system is capable of adjusting the total number of available subbands;

means for symbol demapping the stream of recovered data symbols in accordance with a demodulation scheme to obtain demodulated data;

means for deinterleaving the demodulated data in accordance with a deinterleaving scheme to obtain deinterleaved data; and means for decoding the deinterleaved data in accordance with a decoding scheme to obtain decoded data.

49. The apparatus of claim 48, wherein each pair of vectors of received symbols is for two OFDM symbol periods.

50. The apparatus of claim 48, wherein each pair of vectors of received symbols is for two subbands.

51. The apparatus of claim 48, wherein the system supports a first OFDM symbol size with S subbands and a second OFDM symbol size with L subbands, where S is an integer greater than one and L is an integer multiple of S.

52. The apparatus of claim 51, further comprising:

means for transforming a stream of samples for each of the N receive antennas in accordance with the first or second OFDM symbol size to obtain a corresponding stream of received symbols for the receive antenna, and wherein the stream of vectors of received symbols is obtained from N streams of received symbols for the N receive antennas.

* * * * *